US008648760B2

(12) United States Patent
Parsche

(10) Patent No.: US 8,648,760 B2
(45) Date of Patent: Feb. 11, 2014

(54) CONTINUOUS DIPOLE ANTENNA

(75) Inventor: Francis Eugene Parsche, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 886 days.

(21) Appl. No.: 12/820,977

(22) Filed: Jun. 22, 2010

(65) Prior Publication Data

US 2011/0309988 A1 Dec. 22, 2011

(51) Int. Cl.
*H01Q 9/16* (2006.01)
*G01V 3/00* (2006.01)

(52) U.S. Cl.
USPC ............ 343/793; 343/787; 324/303; 324/338

(58) Field of Classification Search
USPC ............ 343/793
See application file for complete search history.

(56) References Cited

U.S. PATENT DOCUMENTS

| | | | |
|---|---|---|---|
| 2,371,459 | A | 3/1945 | Mittelmann |
| 2,685,930 | A | 8/1954 | Albaugh |
| 3,497,005 | A | 2/1970 | Pelopsky |
| 3,848,671 | A | 11/1974 | Kern |
| 3,954,140 | A | 5/1976 | Hendrick |
| 3,988,036 | A | 10/1976 | Fisher |
| 3,991,091 | A | 11/1976 | Driscoll |
| 4,035,282 | A | 7/1977 | Stuchberry et al. |
| 4,042,487 | A | 8/1977 | Seguchi et al. |
| 4,087,781 | A | 5/1978 | Grossi et al. |
| 4,136,014 | A | 1/1979 | Vermeulen |
| 4,140,179 | A | 2/1979 | Kasevich et al. |
| 4,140,180 | A | 2/1979 | Bridges et al. |
| 4,144,935 | A | 3/1979 | Bridges et al. |
| 4,146,125 | A | 3/1979 | Sanford et al. |
| 4,196,329 | A | 4/1980 | Rowland et al. |

(Continued)

FOREIGN PATENT DOCUMENTS

| | | | |
|---|---|---|---|
| CA | 1199573 | A1 | 1/1986 |
| CA | 2678473 | | 8/2009 |

(Continued)

OTHER PUBLICATIONS

U.S. Appl. No. 12/886,338, filed Sep. 20, 2010 (unpublished).

(Continued)

*Primary Examiner* — Jerome Jackson, Jr.
*Assistant Examiner* — Andrea Lindgren Baltzell
(74) *Attorney, Agent, or Firm* — Allen, Dyer, Doppelt, Milbrath & Gilchrist, P.A.

(57) ABSTRACT

A dipole antenna may be created by surrounding a portion of the continuous conductor with a nonconductive magnetic bead, and then applying a power source to the continuous conductor across the nonconductive magnetic bead. The nonconductive magnetic bead creates a driving discontinuity without requiring a break or gap in the conductor. The power source may be connected or applied to the continuous conductor using a variety of preferably shielded configurations, including a coaxial or twin-axial inset or offset feed, a triaxial inset feed, or a diaxial offset feed. A second nonconductive magnetic bead may be positioned to surround a second portion of the continuous conductor to effectively create two nearly equal length dipole antenna sections on either side of the first nonconductive magnetic bead. The nonconductive magnetic beads may be comprised of various nonconductive magnetic materials, and preformed for installation around the conductor, or injected around the conductor in subsurface applications. Electromagnetic heating of hydrocarbon ores may be accomplished.

23 Claims, 16 Drawing Sheets

(56) References Cited

U.S. PATENT DOCUMENTS

| | | | | |
|---|---|---|---|---|
| 4,265,307 | A | 5/1981 | Elkins | |
| 4,295,880 | A | 10/1981 | Horner | |
| 4,300,219 | A | 11/1981 | Joyal | |
| 4,301,865 | A | 11/1981 | Kasevich et al. | |
| 4,328,324 | A | 5/1982 | Kock | |
| 4,373,581 | A | 2/1983 | Toellner | |
| 4,396,062 | A | 8/1983 | Iskander | |
| 4,404,123 | A | 9/1983 | Chu | |
| 4,410,216 | A | 10/1983 | Allen | |
| 4,425,227 | A | 1/1984 | Smith | |
| 4,449,585 | A | 5/1984 | Bridges et al. | |
| 4,456,065 | A | 6/1984 | Heim | |
| 4,457,365 | A | 7/1984 | Kasevich et al. | |
| 4,470,459 | A | 9/1984 | Copland | |
| 4,485,869 | A | 12/1984 | Sresty | |
| 4,487,257 | A | 12/1984 | Dauphine | |
| 4,508,168 | A | 4/1985 | Heeren | |
| 4,514,305 | A | 4/1985 | Filby | |
| 4,524,827 | A | 6/1985 | Bridges | |
| 4,531,468 | A | 7/1985 | Simon | |
| 4,583,586 | A | 4/1986 | Fujimoto et al. | |
| 4,620,593 | A | 11/1986 | Haagensen | |
| 4,622,496 | A | 11/1986 | Dattili | |
| 4,624,901 | A * | 11/1986 | Glass | 428/469 |
| 4,645,585 | A | 2/1987 | White | |
| 4,678,034 | A | 7/1987 | Eastlund | |
| 4,703,433 | A | 10/1987 | Sharrit | |
| 4,710,713 | A * | 12/1987 | Strikman | 324/303 |
| 4,790,375 | A | 12/1988 | Bridges | |
| 4,817,711 | A | 4/1989 | Jeambey | |
| 4,882,984 | A | 11/1989 | Eves, II | |
| 4,892,782 | A | 1/1990 | Fisher et al. | |
| 5,046,559 | A | 9/1991 | Glandt | |
| 5,055,180 | A | 10/1991 | Klaila | |
| 5,065,819 | A | 11/1991 | Kasevich | |
| 5,082,054 | A | 1/1992 | Kiamanesh | |
| 5,136,249 | A | 8/1992 | White | |
| 5,199,488 | A | 4/1993 | Kasevich | |
| 5,233,306 | A | 8/1993 | Misra | |
| 5,236,039 | A | 8/1993 | Edelstein | |
| 5,251,700 | A | 10/1993 | Nelson | |
| 5,293,936 | A | 3/1994 | Bridges | |
| 5,304,767 | A | 4/1994 | MacGaffigan | |
| 5,315,561 | A | 5/1994 | Grossi | |
| 5,370,477 | A | 12/1994 | Bunin | |
| 5,378,879 | A | 1/1995 | Monovoukas | |
| 5,506,592 | A | 4/1996 | MacDonald | |
| 5,582,854 | A | 12/1996 | Nosaka | |
| 5,621,844 | A | 4/1997 | Bridges | |
| 5,631,562 | A | 5/1997 | Cram | |
| 5,746,909 | A | 5/1998 | Calta | |
| 5,910,287 | A | 6/1999 | Cassin | |
| 5,923,299 | A | 7/1999 | Brown et al. | |
| 6,045,648 | A | 4/2000 | Palmgren et al. | |
| 6,046,464 | A | 4/2000 | Schetzina | |
| 6,055,213 | A | 4/2000 | Rubbo | |
| 6,063,338 | A | 5/2000 | Pham | |
| 6,097,262 | A | 8/2000 | Combellack | |
| 6,106,895 | A | 8/2000 | Usuki | |
| 6,112,273 | A | 8/2000 | Kau | |
| 6,184,427 | B1 | 2/2001 | Klepfer | |
| 6,229,603 | B1 | 5/2001 | Coassin | |
| 6,232,114 | B1 | 5/2001 | Coassin | |
| 6,301,088 | B1 | 10/2001 | Nakada | |
| 6,303,021 | B2 | 10/2001 | Winter et al. | |
| 6,348,679 | B1 | 2/2002 | Ryan et al. | |
| 6,360,819 | B1 | 3/2002 | Vinegar | |
| 6,432,365 | B1 | 8/2002 | Levin | |
| 6,518,754 | B1 * | 2/2003 | Edwards | 324/303 |
| 6,603,309 | B2 | 8/2003 | Forgang | |
| 6,613,678 | B1 | 9/2003 | Sakaguchi | |
| 6,614,059 | B1 | 9/2003 | Tsujimura et al. | |
| 6,649,888 | B2 | 11/2003 | Ryan et al. | |
| 6,712,136 | B2 | 3/2004 | de Rouffignac | |
| 6,808,935 | B2 | 10/2004 | Levin | |
| 6,923,273 | B2 | 8/2005 | Terry | |
| 6,932,155 | B2 | 8/2005 | Vinegar | |
| 6,958,704 | B2 * | 10/2005 | Vinegar et al. | 340/854.3 |
| 6,967,589 | B1 | 11/2005 | Peters | |
| 6,992,630 | B2 | 1/2006 | Parsche | |
| 7,046,584 | B2 | 5/2006 | Sorrells | |
| 7,079,081 | B2 | 7/2006 | Parsche et al. | |
| 7,091,460 | B2 | 8/2006 | Kinzer | |
| 7,109,457 | B2 | 9/2006 | Kinzer | |
| 7,115,847 | B2 | 10/2006 | Kinzer | |
| 7,147,057 | B2 | 12/2006 | Steele | |
| 7,172,038 | B2 | 2/2007 | Terry | |
| 7,205,947 | B2 | 4/2007 | Parsche | |
| 7,312,428 | B2 | 12/2007 | Kinzer | |
| 7,322,416 | B2 | 1/2008 | Burris, II | |
| 7,337,980 | B2 | 3/2008 | Schaedel | |
| 7,438,807 | B2 | 10/2008 | Garner et al. | |
| 7,441,597 | B2 | 10/2008 | Kasevich | |
| 7,461,693 | B2 | 12/2008 | Considine et al. | |
| 7,484,561 | B2 | 2/2009 | Bridges | |
| 7,562,708 | B2 | 7/2009 | Cogliandro | |
| 7,623,804 | B2 | 11/2009 | Sone | |
| 7,828,057 | B2 * | 11/2010 | Kearl et al. | 166/248 |
| 2002/0032534 | A1 | 3/2002 | Regier | |
| 2004/0031731 | A1 | 2/2004 | Honeycutt | |
| 2005/0199386 | A1 | 9/2005 | Kinzer | |
| 2005/0274513 | A1 | 12/2005 | Schultz | |
| 2006/0038083 | A1 | 2/2006 | Criswell | |
| 2007/0108202 | A1 | 5/2007 | Kinzer | |
| 2007/0131591 | A1 | 6/2007 | Pringle | |
| 2007/0137852 | A1 | 6/2007 | Considine et al. | |
| 2007/0137858 | A1 | 6/2007 | Considine et al. | |
| 2007/0187089 | A1 | 8/2007 | Bridges | |
| 2007/0261844 | A1 | 11/2007 | Cogliandro et al. | |
| 2008/0073079 | A1 | 3/2008 | Tranquilla | |
| 2008/0143330 | A1 | 6/2008 | Madio | |
| 2009/0009410 | A1 | 1/2009 | Dolgin et al. | |
| 2009/0242196 | A1 | 10/2009 | Pao | |
| 2010/0233969 | A1 * | 9/2010 | Frolik et al. | 455/67.14 |
| 2011/0309990 | A1 | 12/2011 | Parsche | |
| 2012/0067580 | A1 | 3/2012 | Parsche | |

FOREIGN PATENT DOCUMENTS

| | | | |
|---|---|---|---|
| DE | 10 2008 022176 | A1 | 11/2009 |
| EP | 0 135 966 | | 4/1985 |
| EP | 0418117 | A1 | 3/1991 |
| EP | 0563999 | A2 | 10/1993 |
| EP | 1106672 | A1 | 6/2001 |
| FR | 1586066 | A | 2/1970 |
| FR | 2925519 | A1 | 6/2009 |
| JP | 56050119 | A | 5/1981 |
| JP | 2246502 | A | 10/1990 |
| WO | WO 2007/133461 | | 11/2007 |
| WO | WO2008/011412 | A2 | 1/2008 |
| WO | WO 2008/030337 | | 3/2008 |
| WO | WO2008098850 | A1 | 8/2008 |
| WO | WO2009027262 | A1 | 3/2009 |
| WO | WO2009/114934 | A1 | 9/2009 |

OTHER PUBLICATIONS

Butler, R.M. "Theoretical Studies on the Gravity Drainage of Heavy Oil During In-Situ Steam Heating", Can J. Chem Eng, vol. 59, 1981.

Butler, R. and Mokrys, I., "A New Process (VAPEX) for Recovering Heavy Oils Using Hot Water and Hydrocarbon Vapour", Journal of Canadian Petroleum Technology, 30(1), 97-106, 1991.

Butler, R. and Mokrys, I., "Recovery of Heavy Oils Using Vapourized Hydrocarbon Solvents: Further Development of the VAPEX Process", Journal of Canadian Petroleum Technology, 32(6), 56-62, 1993.

Butler, R. and Mokrys, I., "Closed Loop Extraction Method for the Recovery of Heavy Oils and Bitumens Underlain by Aquifers: the VAPEX Process", Journal of Canadian Petroleum Technology, 37(4), 41-50, 1998.

Das, S.K. and Butler, R.M., "Extraction of Heavy Oil and Bitumen Using Solvents at Reservoir Pressure" CIM 95-118, presented at the CIM 1995 Annual Technical Conference in Calgary, Jun. 1995.

(56) References Cited

OTHER PUBLICATIONS

Das, S.K. and Butler, R.M., "Diffusion Coefficients of Propane and Butane in Peace River Bitumen" Canadian Journal of Chemical Engineering, 74, 988-989, Dec. 1996.

Das, S.K. and Butler, R.M., "Mechanism of the Vapour Extraction Process for Heavy Oil and Bitumen", Journal of Petroleum Science and Engineering, 21, 43-59, 1998.

Dunn, S.G., Nenniger, E. and Rajan, R., "A Study of Bitumen Recovery by Gravity Drainage Using Low Temperature Soluble Gas Injection", Canadian Journal of Chemical Engineering, 67, 978-991, Dec. 1989.

Frauenfeld, T., Lillico, D., Jossy, C., Vilcsak, G., Rabeeh, S. and Singh, S., "Evaluation of Partially Miscible Processes for Alberta Heavy Oil Reservoirs", Journal of Canadian Petroleum Technology, 37(4), 17-24, 1998.

Mokrys, I., and Butler, R., "In Situ Upgrading of Heavy Oils and Bitumen by Propane Deasphalting: The VAPEX Process", SPE 25452, presented at the SPE Production Operations Symposium held in Oklahoma City OK USA, Mar. 21-23, 1993.

Nenniger, J.E. and Dunn, S.G., "How Fast is Solvent Based Gravity Drainage?", CIPC 2008-139, presented at the Canadian International Petroleum Conference, held in Calgary, Alberta Canada, Jun. 17-19, 2008.

Nenniger, J.E. and Gunnewick, L., "Dew Point vs. Bubble Point: A Misunderstood Constraint on Gravity Drainage Processes", CIPC 2009-065, presented at the Canadian International Petroleum Conference, held in Calgary, Alberta Canada, Jun. 16-18, 2009.

Bridges, J.E., Sresty, G.C., Spencer, H.L. and Wattenbarger, R.A., "Electromagnetic Stimulation of Heavy Oil Wells", 1221-1232, Third International Conference on Heavy Oil Crude and Tar Sands, UNITAR/UNDP, Long Beach California, USA Jul. 22-31, 1985.

Carrizales, M.A., Lake, L.W. and Johns, R.T., "Production Improvement of Heavy Oil Recovery by Using Electromagnetic Heating", SPE115723, presented at the 2008 SPE Annual Technical Conference and Exhibition held in Denver, Colorado, USA, Sep. 21-24, 2008.

Carrizales, M. and Lake, L.W., "Two-Dimensional COMSOL Simulation of Heavy-Oil Recovery by Electromagnetic Heating", Proceedings of the COMSOL Conference Boston, 2009.

Chakma, A. and Jha, K.N., "Heavy-Oil Recovery from Thin Pay Zones by Electromagnetic Heating", SPE24817, presented at the 67th Annual Technical Conference and Exhibition of the Society of Petroleum Engineers held in Washington, DC, Oct. 4-7, 1992.

Chhetri, A.B. and Islam, M.R., "A Critical Review of Electromagnetic Heating for Enhanced Oil Recovery", Petroleum Science and Technology, 26(14), 1619-1631, 2008.

Chute, F.S., Vermeulen, F.E., Cervenan, M.R. and McVea, F.J., "Electrical Properties of Athabasca Oil Sands", Canadian Journal of Earth Science, 16, 2009-2021, 1979.

Davidson, R.J., "Electromagnetic Stimulation of Lloydminster Heavy Oil Reservoirs", Journal of Canadian Petroleum Technology, 34(4), 15-24, 1995.

Hu, Y., Jha, K.N. and Chakma, A., "Heavy-Oil Recovery from Thin Pay Zones by Electromagnetic Heating", Energy Sources, 21(1-2), 63-73, 1999.

Kasevich, R.S., Price, S.L., Faust, D.L. and Fontaine, M.F., "Pilot Testing of a Radio Frequency Heating System for Enhanced Oil Recovery from Diatomaceous Earth", SPE28619, presented at the SPE 69th Annual Technical Conference and Exhibition held in New Orleans LA, USA, Sep. 25-28, 1994.

Koolman, M., Huber, N., Diehl, D. and Wacker, B., "Electromagnetic Heating Method to Improve Steam Assisted Gravity Drainage", SPE117481, presented at the 2008 SPE International Thermal Operations and Heavy Oil Symposium held in Calgary, Alberta, Canada, Oct. 20-23, 2008.

Kovaleva, L.A., Nasyrov, N.M. and Khaidar, A.M., Mathematical Modelling of High-Frequency Electromagnetic Heating of the Bottom-Hole Area of Horizontal Oil Wells, Journal of Engineering Physics and Thermophysics, 77(6), 1184-1191, 2004.

McGee, B.C.W. and Donaldson, R.D., "Heat Transfer Fundamentals for Electro-thermal Heating of Oil Reservoirs", CIPC 2009-024, presented at the Canadian International Petroleum Conference, held in Calgary, Alberta, Canada Jun. 16-18, 2009.

Ovalles, C., Fonseca, A., Lara, A., Alvarado, V., Urrecheaga, K., Ranson, A. and Mendoza, H., "Opportunities of Downhole Dielectric Heating in Venezuela: Three Case Studies Involving Medium, Heavy and Extra-Heavy Crude Oil Reservoirs" SPE78980, presented at the 2002 SPE International Thermal Operations and Heavy Oil Symposium and International Horizontal Well Technology Conference held in Calgary, Alberta, Canada, Nov. 4-7, 2002.

Rice, S.A., Kok, A.L. and Neate, C.J., "A Test of the Electric Heating Process as a Means of Stimulating the Productivity of an Oil Well in the Schoonebeek Field", CIM 92-04 presented at the CIM 1992 Annual Technical Conference in Calgary, Jun. 7-10, 1992.

Sahni, A. and Kumar, M. "Electromagnetic Heating Methods for Heavy Oil Reservoirs", SPE62550, presented at the 2000 SPE/AAPG Western Regional Meeting held in Long Beach, California, Jun. 19-23, 2000.

Sayakhov, F.L., Kovaleva, L.A. and Nasyrov, N.M., "Special Features of Heat and Mass Exchange in the Face Zone of Boreholes upon Injection of a Solvent with a Simultaneous Electromagnetic Effect", Journal of Engineering Physics and Thermophysics, 71(1), 161-165, 1998.

Spencer, H.L., Bennett, K.A. and Bridges, J.E. "Application of the IITRI/Uentech Electromagnetic Stimulation Process to Canadian Heavy Oil Reservoirs" Paper 42, Fourth International Conference on Heavy Oil Crude and Tar Sands, UNITAR/UNDP, Edmonton, Alberta, Canada, Aug. 7-12, 1988.

Sresty, G.C., Dev, H., Snow, R.H. and Bridges, J.E., "Recovery of Bitumen from Tar Sand Deposits with the Radio Frequency Process", SPE Reservoir Engineering, 85-94, Jan. 1986.

Vermulen, F. and McGee, B.C.W., "In Situ Electromagnetic Heating for Hydrocarbon Recovery and Environmental Remediation", Journal of Canadian Petroleum Technology, Distinguished Author Series, 39(8), 25-29, 2000.

Schelkunoff, S.K. and Friis, H.T., "Antennas: Theory and Practice", John Wiley & Sons, Inc., London, Chapman Hall, Limited, pp. 229-244, 351-353, 1952.

Gupta, S.C., Gittins, S.D., "Effect of Solvent Sequencing And Other Enhancement On Solvent Aided Process", Journal of Canadian Petroleum Technology, vol. 46, No. 9, pp. 57-61, Sep. 2007.

Rothammel, Karl, "Rothammel's Antennenbuch", DARC Verlag Baunatel, 2001, pp. 126-129 (no English translation available).

M/A-COM (an AMP Company) Application Note, "RF Directional Couplers and 3dB Hybrids Overview", M560, V2.00, date not available, pp. 10-5-10-14.

PCT Notification of Transmittal of the International Search Report and The Written Opinion of the International Searching Authority, or the Declaration, in PCT/US2010/025761, dated Feb. 9, 2011.

PCT Notification of Transmittal of the International Search Report and The Written Opinion of the International Searching Authority, or the Declaration, in PCT/US2010/057090, dated Mar. 3, 2011.

"Control of Hazardous Air Pollutants From Mobile Sources", U.S. Environmental Protection Agency, Mar. 29, 2006. p. 15853 (http://www.epa.gov/EPA-AIR/2006/March/Day-29/a2315b.htm).

Von Hippel, Arthur R., Dielectrics and Waves, Copyright 1954, Library of Congress Catalog Card No. 54-11020, Contents, pp. xi-xii; Chapter II, Section 17, "Polyatomic Molecules", pp. 150-155; Appendix C-E, pp. 273-277, New York, John Wiley and Sons.

United States Patent and Trademark Office, Non-final Office action issued in U.S. Appl. No. 12/396,247, dated Mar. 28, 2011.

United States Patent and Trademark Office, Non-final Office action issued in U.S. Appl. No. 12/396,284, dated Apr. 26, 2011.

Patent Cooperation Treaty, Notification of Transmittal of the International Search Report and The Written Opinion of the International Searching Authority, or the Declaration, in PCT/US2010/025808, dated Apr. 5, 2011.

Deutsch, C.V., McLennan, J.A., "The Steam Assisted Gravity Drainage (SAGD) Process," Guide to SAGD (Steam Assisted Gravity Drainage) Reservoir Characterization Using Geostatistics, Centre for

(56) References Cited

OTHER PUBLICATIONS

Computational Statistics (CCG), Guidebook Series, 2005, vol. 3; p. 2, section 1.2, published by Centre for Computational Statistics, Edmonton, AB, Canada.
Marcuvitz, Nathan, Waveguide Handbook; 1986; Institution of Engineering and Technology, vol. 21 of IEE Electromagnetic Wave series, ISBN 0863410588, Chapter 1, pp. 1-54, published by Peter Peregrinus Ltd. on behalf of The Institution of Electrical Engineers, © 1986.
Marcuvitz, Nathan, Waveguide Handbook; 1986; Institution of Engineering and Technology, vol. 21 of IEE Electromagnetic Wave series, ISBN 0863410588, Chapter 2.3, pp. 66-72, published by Peter Peregrinus Ltd. on behalf of The Institution of Electrical Engineers, © 1986.
"Oil sands." Wikipedia, the free encyclopedia. Retrieved from the Internet from: http://en.wikipedia.org/w/index.php?title=Oil_sands &printable=yes, Feb. 16, 2009.
Sahni et al., "Electromagnetic Heating Methods for Heavy Oil Reservoirs." 2000 Society of Petroleum Engineers SPE/AAPG Western Regional Meeting, Jun. 19-23, 2000.
Power et al., "Froth Treatment: Past, Present & Future." Oil Sands Symposium, University of Alberta, May 3-5, 2004.
Flint, "Bitumen Recovery Technology A Review of Long Term R&D Opportunities." Jan. 31, 2005. LENEF Consulting (1994) Limited.
"Froth Flotation." Wikipedia, the free encyclopedia. Retrieved from the internet from: http://en.wikipedia.org/wiki/Froth_flotation, Apr. 7, 2009.
"Relative static permittivity." Wikipedia, the free encyclopedia. Retrieved from the Internet from http://en.wikipedia.org/w/index/php?title=Relative_static_permittivity&printable=yes, Feb. 12, 2009.
"Tailings." Wikipedia, the free encyclopedia. Retrieved from the Internet from http://en.wikipedia.org/w/index.php?title=Tailings &printable=yes, Feb. 12, 2009.
"Technologies for Enhanced Energy Recovery" Executive Summary, Radio Frequency Dielectric Heating Technologies for Conventional and Non-Conventional Hydrocarbon-Bearing Formulations, Quasar Energy, LLC, Sep. 3, 2009, pp. 1-6.
Burnhan, "Slow Radio-Frequency Processing of Large Oil Shale Volumes to Produce Petroleum-like Shale Oil," U.S. Department of Energy, Lawrence Livermore National Laboratory, Aug. 20, 2003, UCRL-ID-155045.
Sahni et al., "Electromagnetic Heating Methods for Heavy Oil Reservoirs," U.S. Department of Energy, Lawrence Livermore National Laboratory, May 1, 2000, UCL-JC-138802.
Abernethy, "Production Increase of Heavy Oils by Electromagnetic Heating," The Journal of Canadian Petroleum Technology, Jul.-Sep. 1976, pp. 91-97.
Sweeney, et al., "Study of Dielectric Properties of Dry and Saturated Green River Oil Shale," Lawrence Livermore National Laboratory, Mar. 26, 2007, revised manuscript Jun. 29, 2007, published on Web Aug. 25, 2007.
Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-18.
Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-33.
Kinzer, A Review of Notable Intellectual Property for In Situ Electromagnetic Heating of Oil Shale, Quasar Energy LLC.
A. Godio: "Open ended-coaxial Cable Measurements of Saturated Sandy Soils", American Journal of Environmental Sciences, vol. 3, No. 3, 2007, pp. 175-182, XP002583544.
Carlson et al., "Development of the I IT Research Institute RF Heating Process For In Situ Oil Shale/Tar Sand Fuel Extraction—An Overview", Apr. 1981.
PCT International Search Report and Written Opinion in PCT/US2010/025763, Jun. 4, 2010.
PCT International Search Report and Written Opinion in PCT/US2010/025807, Jun. 17, 2010.
PCT International Search Report and Written Opinion in PCT/US2010/025804, Jun. 30, 2010.
PCT International Search Report and Written Opinion in PCT/US2010/025769, Jun. 10, 2010.
PCT International Search Report and Written Opinion in PCT/US2010/025765, Jun. 30, 2010.
PCT International Search Report and Written Opinion in PCT/US2010/025772, Aug. 9, 2010.

* cited by examiner

CONTINUOUS DIPOLE ANTENNA

STATEMENT REGARDING FEDERALLY SPONSORED RESEARCH OR DEVELOPMENT

[Not Applicable]

CROSS REFERENCE TO RELATED APPLICATIONS

This specification is related to application Ser. No. 12/820,814 filed Jun. 22, 2010, which is incorporated by reference here.

BACKGROUND OF THE INVENTION

The present invention relates to radio frequency ("RF") antennas. In particular, the present invention relates to an advantageous apparatus and method for using a continuous conductor, such as oil well piping, as a dipole antenna to transmit RF energy for heating.

As the world's standard crude oil reserves are depleted, and the continued demand for oil causes oil prices to rise, oil producers are attempting to process hydrocarbons from bituminous ore, oil sands, tar sands, and heavy oil deposits. These materials are often found in naturally occurring mixtures of sand or clay. Because of the extremely high viscosity of bituminous ore, oil sands, oil shale, tar sands, and heavy oil, the drilling and refinement methods used in extracting standard crude oil are typically not available. Therefore, recovery of oil from these deposits requires heating to separate hydrocarbons from other geologic materials and to maintain hydrocarbons at temperatures at which they will flow. Steam is typically used to provide this heat in what is known as a steam assisted gravity drainage system, or SAGD system. Electric and RF heating are sometimes employed as well. The heating and processing can take place in-situ, or in another location after strip mining the deposits.

Heating subsurface heavy oil bearing formations by prior RF systems has been inefficient due to traditional methods of matching the impedances of the power source (transmitter) and the heterogeneous material being heated, uneven heating resulting in unacceptable thermal gradients in heated material, inefficient spacing of electrodes/antennae, poor electrical coupling to the heated material, limited penetration of material to be heated by energy emitted by prior antennae and frequency of emissions due to antenna forms and frequencies used. Antennas used for prior RF heating of heavy oil in subsurface formations have typically been dipole antennas. U.S. Pat. Nos. 4,140,179 and 4,508,168 disclose prior dipole antennas positioned within subsurface heavy oil deposits to heat those deposits.

Arrays of dipole antennas have been used to heat subsurface formations. U.S. Pat. No. 4,196,329 discloses an array of dipole antennas that are driven out of phase to heat a subsurface formation.

SUMMARY OF THE INVENTION

An aspect of the invention is a method for using a continuous conductor as a dipole antenna in accordance with the present continuous dipole antenna may comprise surrounding a first portion of a continuous conductor with a first nonconductive magnetic bead, and then applying a power source to the continuous conductor across the nonconductive magnetic bead. The first nonconductive magnetic bead may be comprised of one or more of the following: .ferrite, loadstone, magnetite, powdered iron, iron flakes, silicon steel particles, or pentacarbonyl E iron powder that has surface insulator coatings. Advantageously, the continuous conductor may be comprised of oil well piping.

The power source may be applied using a variety of configurations. For example, the power source may be applied to the continuous conductor using a coaxial or twin-axial feed, each of which having either an inset or offset configuration. Other exemplary configurations may include a triaxial inset feed and a diaxial offset feed.

The method may further comprise surrounding a second portion of the continuous conductor with a second nonconductive magnetic bead to effectively create two nearly equal length dipole antenna sections on either side of the first nonconductive magnetic bead. The second nonconductive magnetic bead may also be comprised of one or more of the following: ferrite, loadstone, magnetite, powdered iron, iron flakes, silicon steel particles, or pentacarbonyl E iron powder ($Fe(CO)_5$) that has surface insulator coatings.

Another aspect of the invention is an apparatus for generating heat using radiofrequency energy in accordance with the present continuous dipole antenna may comprise a first nonconductive magnetic bead positioned to surround a first portion of a continuous conductor, and a power source connected to the continuous conductor on either side of the first nonconductive magnetic bead. The first nonconductive magnetic bead may be comprised of one or more of the following: .ferrite, loadstone, magnetite, powdered iron, iron flakes, silicon steel particles, or pentacarbonyl E iron powder that has surface insulator coatings. Advantageously, the continuous conductor may be comprised of oil well piping.

The power source for the apparatus may be applied using a variety of configurations. For example, the power source may be applied to the continuous conductor using a coaxial or twin-axial feed, each of which having either an inset or offset configuration. Other exemplary configurations may include a triaxial inset feed and a diaxial offset feed.

The apparatus may further comprise a second nonconductive magnetic bead positioned to surround a second portion of the continuous conductor to effectively create two nearly equal length dipole antenna sections on either side of the first nonconductive magnetic bead. The second nonconductive magnetic bead may also be comprised of one or more of the following: .ferrite, loadstone, magnetite, powdered iron, iron flakes, silicon steel particles, or pentacarbonyl E iron powder that has surface insulator coatings.

Other aspects of the invention will be apparent from this disclosure.

DETAILED DESCRIPTION OF THE PREFERRED EMBODIMENTS

The subject matter of this disclosure will now be described more fully, and one or more embodiments of the invention are shown. This invention may, however, be embodied in many different forms and should not be construed as limited to the embodiments set forth herein. Rather, these embodiments are examples of the invention, which has the full scope indicated by the language of the claims.

Figure 1:
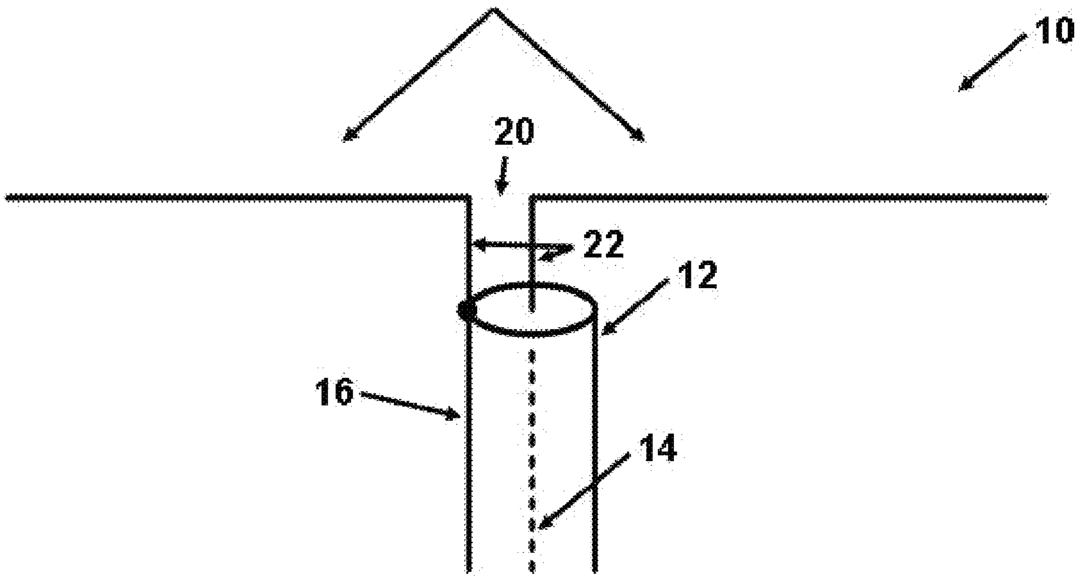
Fig. 1 (Prior Art)
FIG. 1 depicts a typical prior art dipole antenna.

FIG. 1 is a representation of a typical prior art dipole antenna. Prior art antenna 10 includes a coaxial feed 12, which in turn includes an inner conductor 14 and an outer conductor 16. Each of these conductors is connected at one end to a dipole antenna section 18 via a feed line 22. The other ends of conductors 14 and 16 are connected to an alternating current power source (not shown). Unshielded gap or break 20 between dipole antenna sections 18 forms a driving discontinuity that results in radio frequency transmission. Oil well piping is generally unsuited for use as a conventional dipole antenna because a gap or break in the well piping needed to form a driving discontinuity would also form a leak in the piping.

Figure 2:
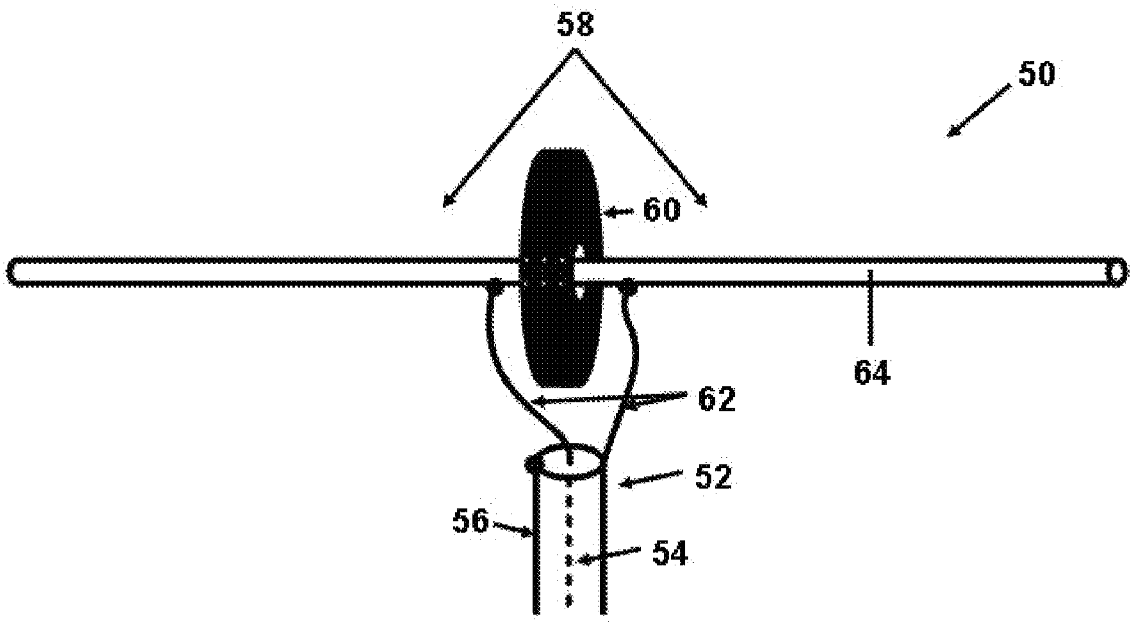
FIG. 2 depicts an embodiment of the present continuous dipole antenna.

Turning now to FIG. 2, the present continuous dipole antenna 50 provides a driving discontinuity in a continuous conductor 64 with no breaks or gaps. Antenna 50 includes a coaxial feed 52, which in turn includes an inner conductor 54 and an outer conductor 56. Each of these conductors is connected at one end to a dipole antenna section 58 via a feed line 62. The other ends of conductors 54 and 56 are connected to an alternating current power source (not shown). Note that there is no unshielded gap or break between dipole antenna sections 58. Instead, a nonconductive magnetic bead 60 is positioned around continuous conductor 64 between feed lines 62. Non-conductive magnetic bead 60 opposes the magnetic field created as current attempts to flow between feed lines 62, and thereby forms a driving discontinuity.

Figure 3:
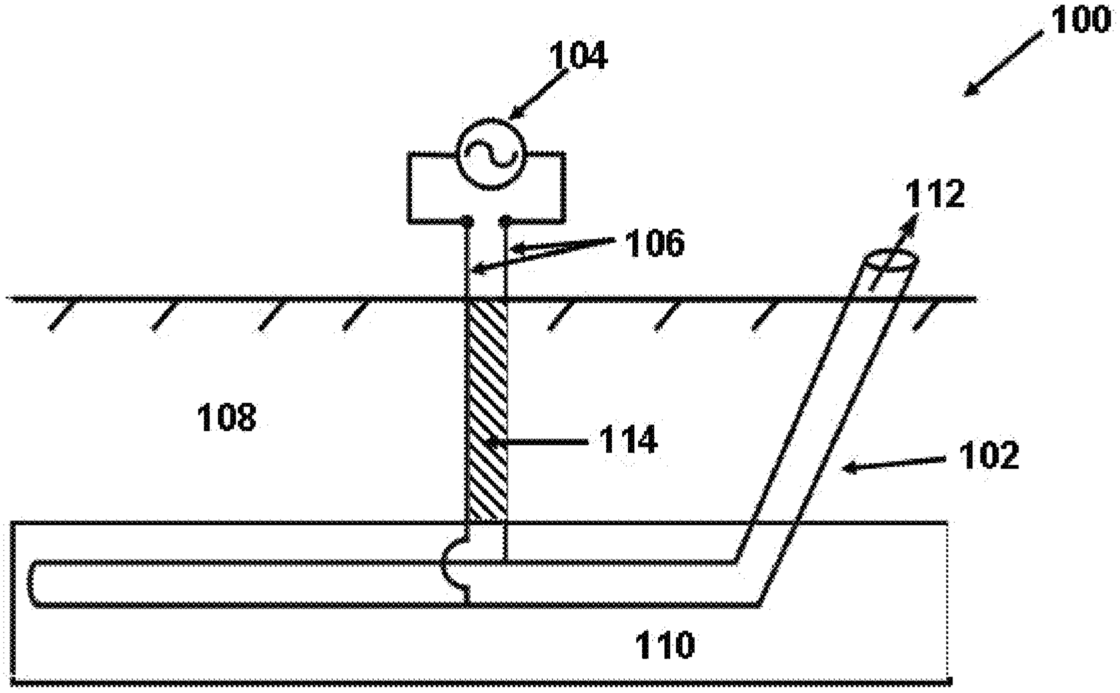
FIG. 3 depicts heating caused by unshielded transmission lines.

Turning to a simplified depiction of a continuous dipole antenna used for oil production in FIG. 3, well pipe 102 is the continuous conductor for continuous dipole antenna 100. The deeper section of well pipe 102 runs through production area 110, which may comprise oil, water, sand and other components. Unshielded feed lines 106 are connected to AC source 104 and descend through shallow section 108 to connect to well pipe 102. A non-conductive magnetic bead (not shown) is positioned around well pipe 102 between the connections from feed lines 106. As production area 110 is heated, oil and other liquids will flow through well pipe 102 to the surface at connection 112. However, the shallower area 108 above production area 110 is typically comprised of very lossy material, and unshielded transmission lines 106 generate heat in area 114 that represents an efficiency loss in this arrangement.

Figure 4:
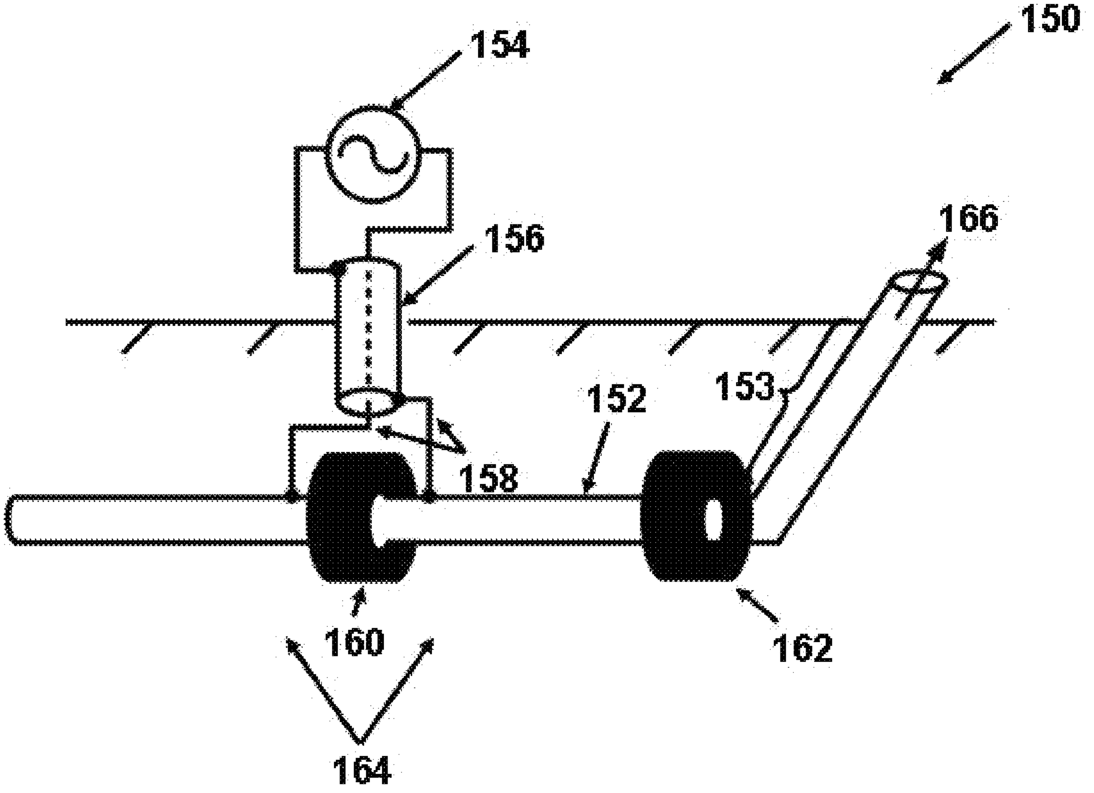
FIG. 4 depicts an embodiment of the present continuous dipole antenna using oil well piping and a coaxial offset feed.

Continuous dipole antenna 150 in FIG. 4 addresses this efficiency loss by use of shielded coaxial feed 156. Shielded coaxial feed 156 is connected to AC source 154 at the surface and descends to connect to well pipe 152 via feed lines 158. A first non-conductive magnetic bead 160 is positioned around well pipe 152 between the connections from feed lines 158. A second non-conductive magnetic bead 162 also surrounds well pipe 152 and is spaced apart from first non-conductive magnetic bead 160 to create two nearly equal length dipole antenna sections 164. Thus, first non-conductive magnetic bead 160 forms a driving discontinuity, while second non-conductive magnetic bead 162 limits antenna section length. As continuous dipole antenna 150 heats the well area, oil and other liquids flow to the surface through well pipe 152 at connection 166.

The non-conductive magnetic beads may be comprised of, for example, ferrite, loadstone, magnetite, powdered iron, iron flakes, silicon steel particles, or pentacarbonyl E iron powder that has surface insulator coatings. The non-conductive magnetic bead materials may be preformed or placed in a matrix material, such as Portland cement, rubber, vinyl, etc., and injected around the well pipe in-situ.

Figure 5:
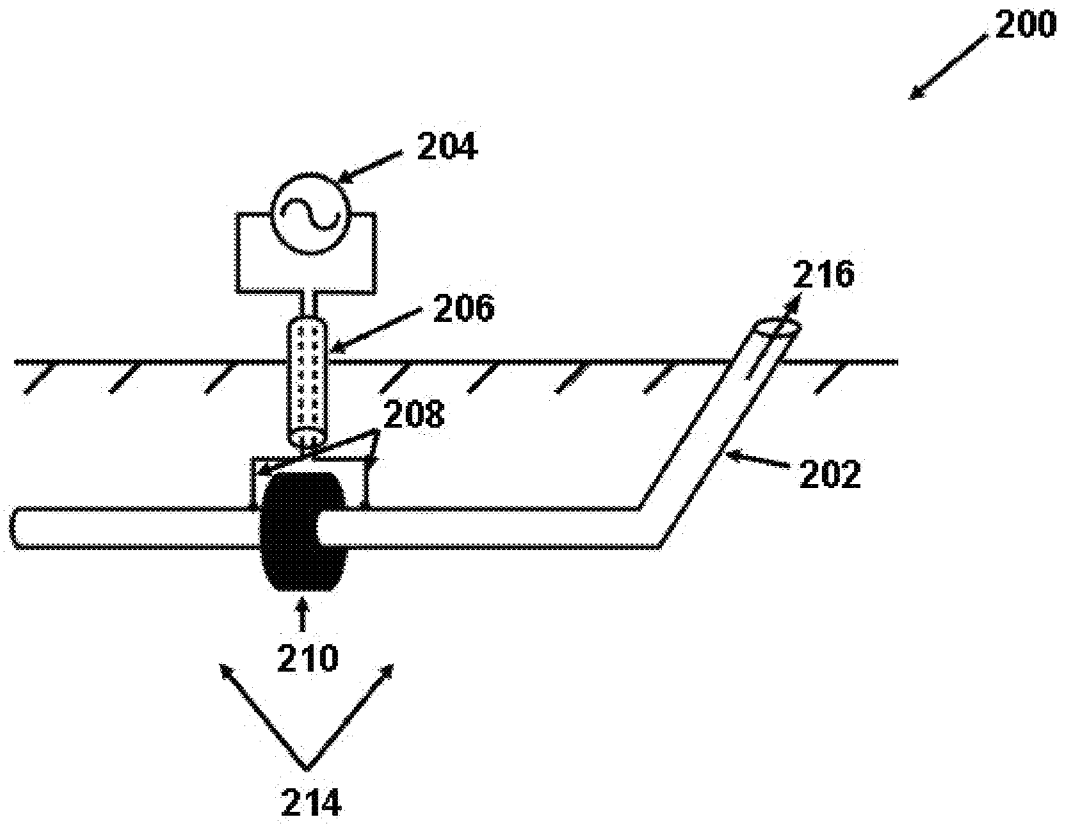
FIG. 5 depicts an embodiment of the present continuous dipole antenna using oil well piping and a twin-axial offset feed.

Continuous dipole antenna 200 in FIG. 5 utilizes a shielded twin-axial feed 206. Shielded twin-axial feed 206 is connected to AC source 204 at the surface and descends to connect to well pipe 202 via feed lines 208. Non-conductive magnetic bead 210 is positioned around well pipe 202 between the connections from feed lines 208. Non-conductive magnetic bead 210 forms a driving discontinuity. Similar to the previous embodiment, a second non-conductive magnetic bead may be positioned to create two nearly equal length dipole antenna sections 214. As continuous dipole antenna 200 heats the well area, oil and other liquids flow to the surface through well pipe 202 at connection 216.

Figure 6:
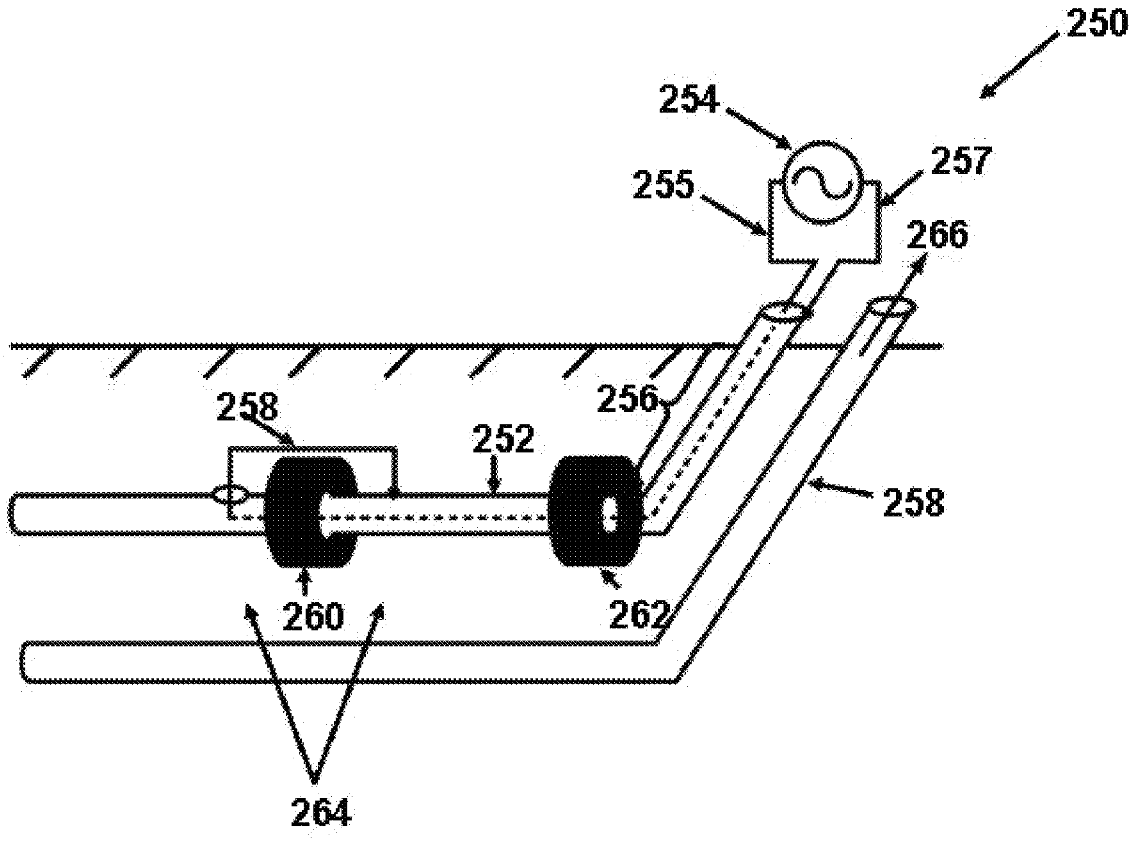
FIG. 6 depicts an embodiment of the present continuous dipole antenna using SAGD well piping and a coaxial inset feed.

Continuous dipole antenna 250 seen in FIG. 6 is employed in conjunction with an existing steam assisted gravity drainage (SAGD) system for in situ processing of hydrocarbons. When used with steam heat, perforated well pipe 252 heated the area around production well pipe 258. In the present embodiment using FR heating, perforated well pipe 252 is used for heating. A coaxial feed connected at the surface to AC source 254 utilizes an inner feed 255, which is routed within perforated well pipe 252, and an outer feed 257 connected to perforated well pipe 252 at the surface. Inner feed 255 is connected to perforated well pipe 252 via connector line 258. A first non-conductive magnetic bead 260 is positioned around well pipe 252 between the connections from inner feed 255 and outer feed 257. This non-conductive magnetic bead 260 forms a driving discontinuity. A second non-conductive magnetic bead 262 is positioned to create two nearly equal length dipole antenna sections 264. Second non-conductive magnetic bead 262 also serves to prevent losses in pipe section 256. As continuous dipole antenna 250 heats the well area, oil and other liquids flow into production well pipe 258 and then to the surface at connection 266. The oil and other liquids are then typically pumped into an extraction tank for storage and/or further processing.

Figure 7:
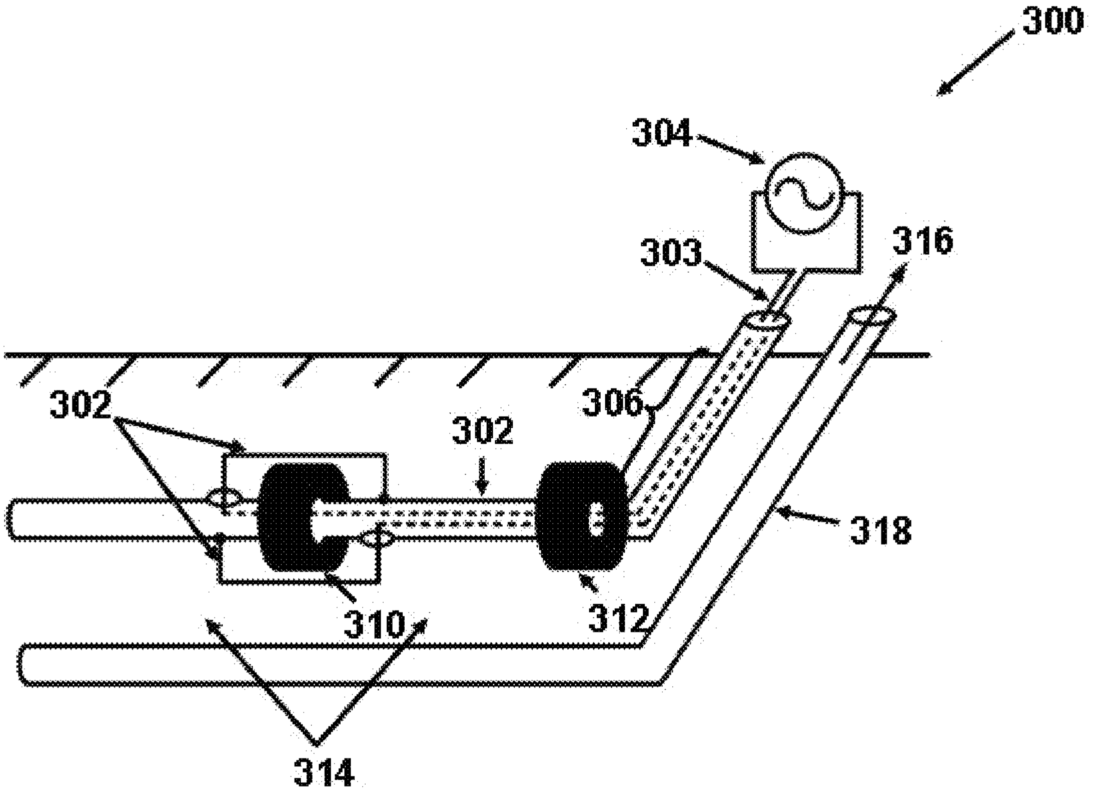
FIG. 7 depicts an embodiment of the present continuous dipole antenna using SAGD well piping and a twin-axial inset feed.

Continuous dipole antenna 300 depicted in FIG. 7 is also used in conjunction with a SAGD system. This antenna uses a twin-axial feed 303 connected at the surface to AC source 304 and routed within perforated well pipe 302. Twin-axial feed 303 is connected to perforated well pipe 302 across a first non-conductive magnetic bead 310 via connector lines 302. First non-conductive magnetic bead 310 forms a driving discontinuity. Second non-conductive magnetic bead 312 is positioned to create two nearly equal length dipole antenna sections 314. Second non-conductive magnetic bead 312 also serves to prevent losses in pipe section 306. As continuous dipole antenna 300 heats the well area, oil and other liquids flow into production well pipe 318 and then to the surface at connection 316.

Figure 8:
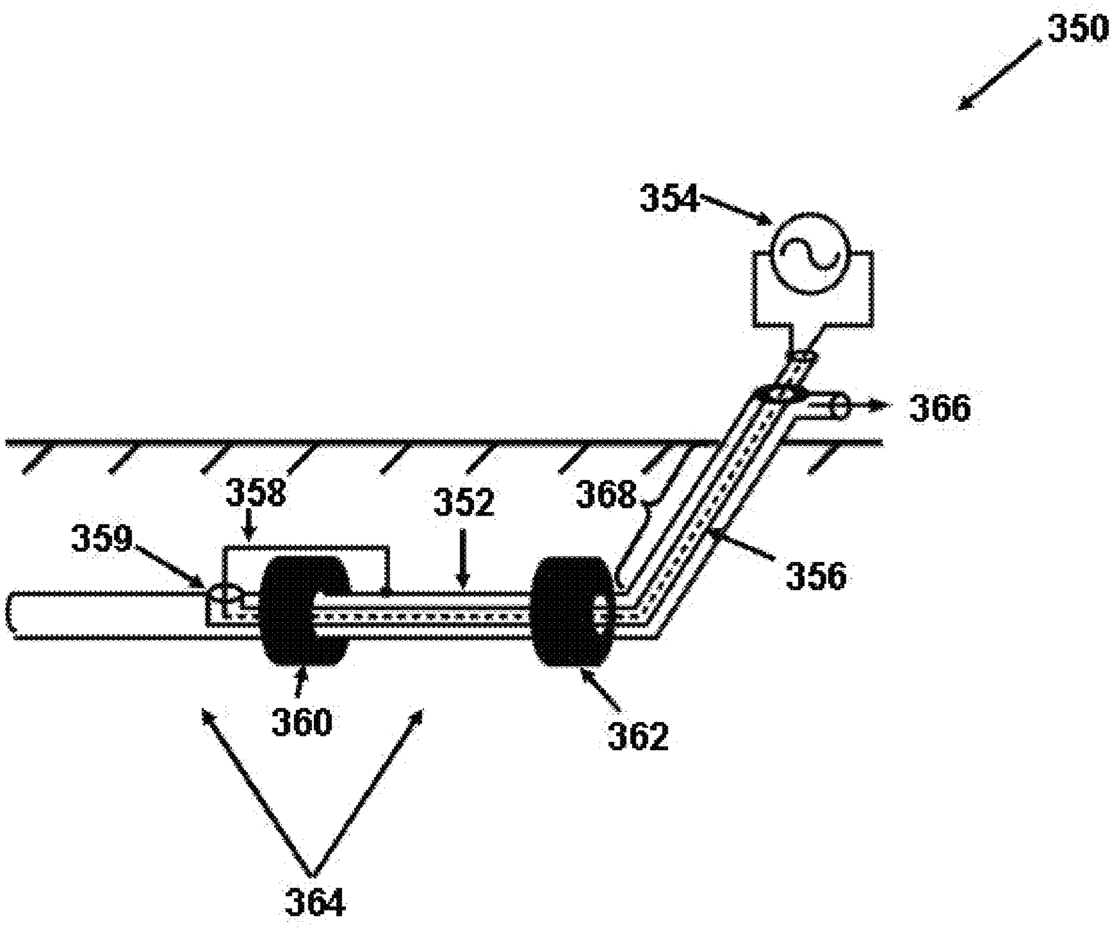
FIG. 8 depicts an embodiment of the present continuous dipole antenna using oil well piping and a triaxial inset feed.

Turning now to FIG. 8, continuous dipole antenna 350 utilizes a shielded triaxial feed 356. Triaxial feed 356 is connected to AC source 354 at the surface and is routed within well pipe 352, and connected across a first non-conductive magnetic bead 360 at connection 359 and via connector line 358. First non-conductive magnetic bead 360 forms a driving discontinuity. Second non-conductive magnetic bead 362 is positioned to create two nearly equal length dipole antenna sections 364. Similar to previous embodiments, second non-conductive magnetic bead 362 also serves to prevent energy and heat losses in pipe section 368. As continuous dipole antenna 350 heats the well area, oil and other liquids flow through well pipe 352 around triaxial feed line 356 and exit at the surface at connection 366.

Figure 9:
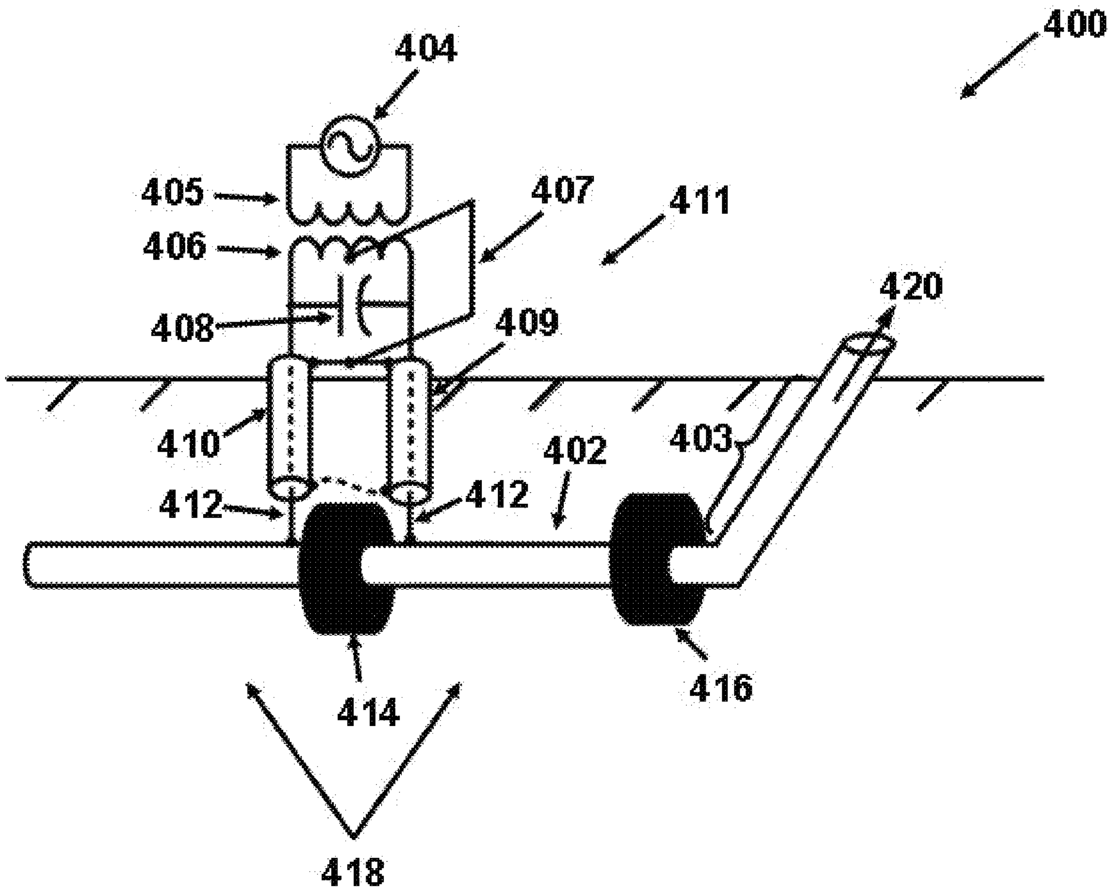
FIG. 9 depicts an embodiment of the present continuous dipole antenna using oil well piping and a diaxial inset feed.

A similar embodiment is shown in FIG. 9, but using a diaxial inset feed arrangement. Diaxial feed 411 is connected to AC source 404 at the surface and descends to well pipe 402. AC source 404 is connected to transformer primary 405. Transformer secondary 406 supplies coaxial feeds 409 and 410. Diaxial feed line is balanced using line 407 and capacitor 408. Coaxial feeds 409 and 410 are connected across first non-conductive magnetic bead 414 via feed lines 412. First non-conductive magnetic bead 414 forms a driving discontinuity. Second non-conductive magnetic bead 416 is positioned to create two nearly equal length dipole antenna sections 418. Second non-conductive magnetic bead 416 also serves to prevent energy and heat losses in pipe section 403. As continuous dipole antenna 400 heats the well area, oil and other liquids flow through well pipe 402 and exit at the surface at connection 420.

Figure 9A:
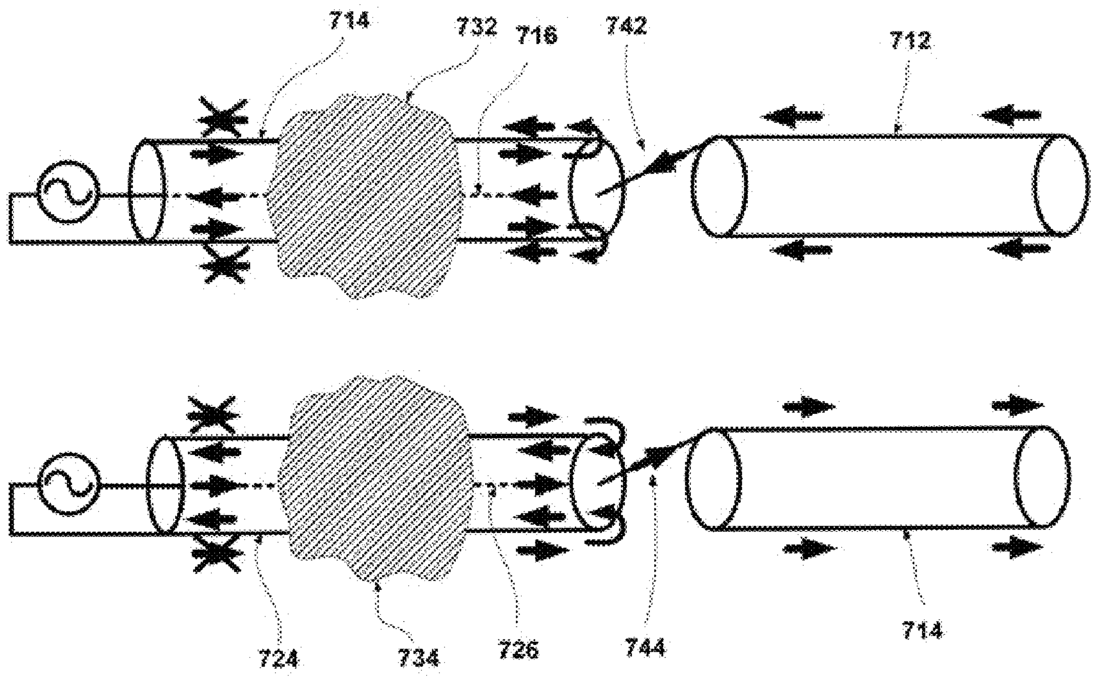
FIG. 9*a* depicts current flows in accordance with the diaxial feed of FIG. 9.

FIG. 9*a* generally depicts the electric and magnetic field dynamics associated with the shielded diaxial inset feed arrangement of FIG. 9. This embodiment is directed towards providing a two-element linear antenna array utilizing two parallel holes in the earth such as the horizontal run of a horizontal directional drilling (HDD) well as may be used for Steam Assist Gravity Drainage extractions. The diaxially fed parallel conductor antenna in FIG. 9*a* may synthesize directional heating patterns and or concentrate heat between the antennas, which is useful, for example, to initiate convection for SAGD startup. The antenna arrangement in FIG. 9*a* provides an inset electrical current feed, and the arrows in denote the presence and direction of electrical currents. The upper antenna element 712 and the lower antenna element 722 may be linear (straight line) electrical conductors, such as metal pipes or wires running through an underground ore. The transmission line pipe sections 714 and 724 may run to transmitters at the surface through an overburden, and they may contain bends (not shown). Coaxial inner conductors 716 and 726 may convey electrical through an overburden.

Magnetic RF chokes 732 and 734 are placed over the transmission line pipe sections where heating with RF electromagnetic fields is not desired. RF chokes 732 and 734 are regions of nonconductive materials, such as ferrite power in Portland cement, and they provide a series inductance to choke off and stop radio frequency electrical currents from flowing on the outside of the pipe. The magnetic RF chokes 732, 734 can be located a distance away from the transpositions 742 and 744, such that the ore surrounding that pipes in those sections will be heated. Alternatively, the RF chokes 732, 734 can be located adjacent to the transpositions 742 and 744 to prevent heating along pipes 714 and 724. The pipe sections 714 and 724 carry currents only on their inner surfaces through the overburden regions where RF electromagnetic heating is not desired.

Pipe sections 716 and 726 function as heating antennas on their exterior while also providing a shielded transmission line on their interior. A duplex current is generated, and the electrical currents flow in different directions on the inside and the outside of the pipe. This is due to a magnetic skin effect and conductor skin effect. Conductive overburdens and underburdens may be excited to function as antennas for ore sandwiched between, thereby providing a horizontal heat spread and boundary area heating. Hence, conductors 712 and 714 may be located near the top and bottom of a horizontally planar ore vein.

Figure 9B:
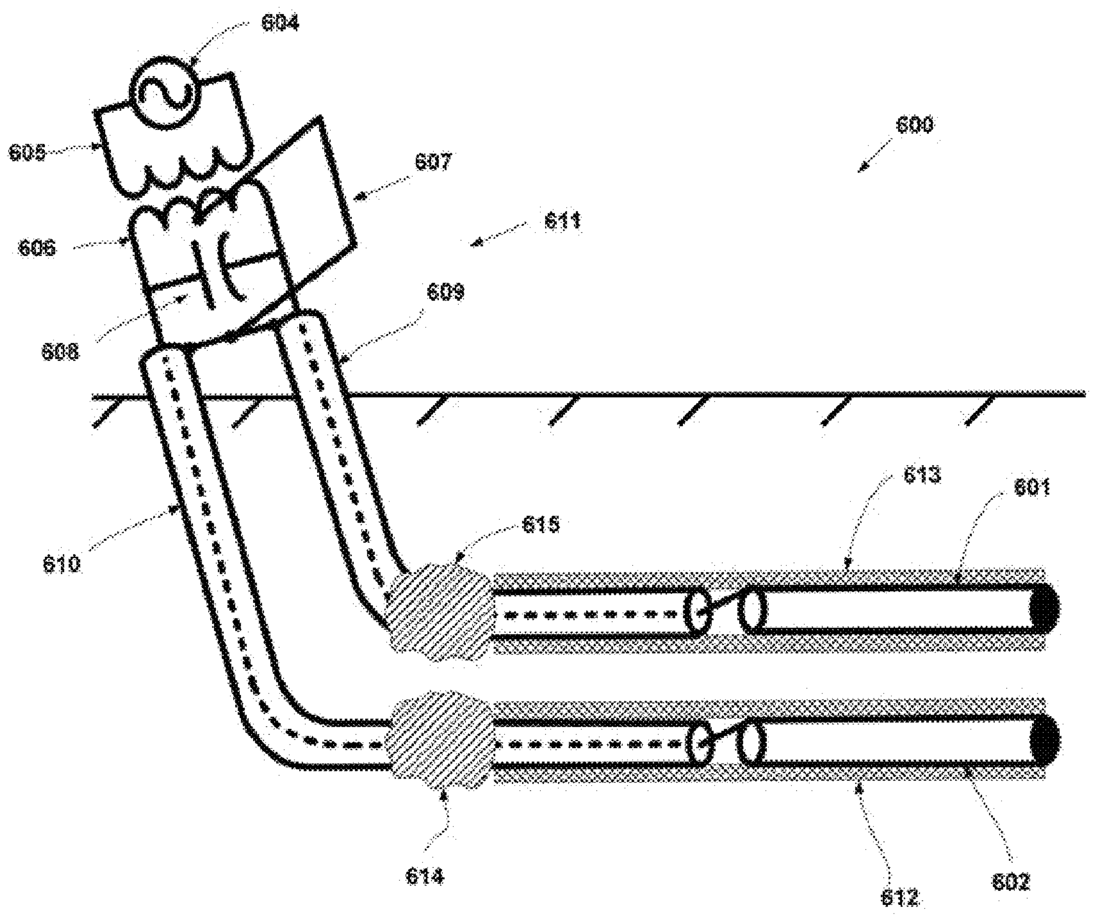
FIG. 9*b* depicts another embodiment of the present continuous dipole antenna using oil well piping and a diaxial feed.

FIG. 9*b* depicts another embodiment of the present continuous dipole antenna 600 using oil well piping and a diaxial feed in a double linear configuration, as opposed to the single linear configuration of FIG. 9. Here, the feed lines feed parallel conductors 601 and 602. These conductors may be pipes, for example when using existing SAGD systems. Diaxial feed 611 is connected to AC source 604 at the surface and descends to well pipes 601 and 602. AC source 604 is connected to transformer primary 605. Transformer secondary 606 supplies coaxial feeds 609 and 610. Diaxial feed line is balanced using line 607 and capacitor 608. Coaxial feeds 609 and 610 are connected to well pipes 601 and 602, respectively. Coaxial feeds 609 and 610 may themselves be comprised of well piping. As a continuous dipole antenna 600 heats the well area, oil and other liquids flow through well pipe 602 and exit at the surface at connection 620.

To vary underground heating patterns, currents on the conductors 601 and 602 can be made parallel or perpendicular. The direction of the currents is dependent on the surface connections, i.e. whether the connections form a differential or common mode antenna array. Here, conductively shielded transmission lines are provided through the overburden region. This advantageously provides a multiple element linear conductor antenna array to be formed underground without having to make underground electrical connections between the well bores, which may be difficult to implement. In addition, it provides shielded coaxial-type transmission of the electrical currents through the overburden to prevent unwanted heating there.

As background, the currents passing through an overburden on electrically insulated, but unshielded conductors may cause unwanted heating in the overburden unless frequencies near DC are used. However, operation at frequencies near DC can be undesirable for many reasons, including the need for liquid water contact, unreliable heating in the ore, and excessive electrical conductor gauge requirements. The present embodiment my operate at any radio frequency without overburden heating concerns, and can heat reliably in the ore without the need for liquid water contact between the antenna conductors and the ore.

Conductors 601 and 602, which are preferentially located in the ore, may be optionally covered with a nonconductive electrical insulation 612 and 613, respectively. Nonconductive electrical insulation 612 and 613 increases the electrical load resistance of the antenna and reduces the conductor ampacity requirement. Thus, small gauge wires, or at least smaller steel pipe or wire may be used. The insulation can reduce or eliminate galvanic corrosion of the conductors as well.

Conductors 601 and 602 heat reliably without conductive contact with the ore by using near magnetic fields (H) and near electric fields (E). The location of nonconductive magnetic chokes 614 and 615 along the pipes determines where the RF heating starts in the earth. Magnetic chokes 614 and 615 may be comprised of a ferrite powder filled cement casing injected into the earth, or be implemented by other means, such as sleeving. The in the electrical network depicted in FIG. 9*b*, the surface provides a 0, 180 degree phase excitation to the pipe antenna elements 601 and 602, which may provide increased horizontal heat spread. As can be appreciated by those of ordinary skill in the art, AC source 604 could be connected to the coaxial transmission line of only one well bore if desired to heat along one underground pipe only.

Figure 9C:
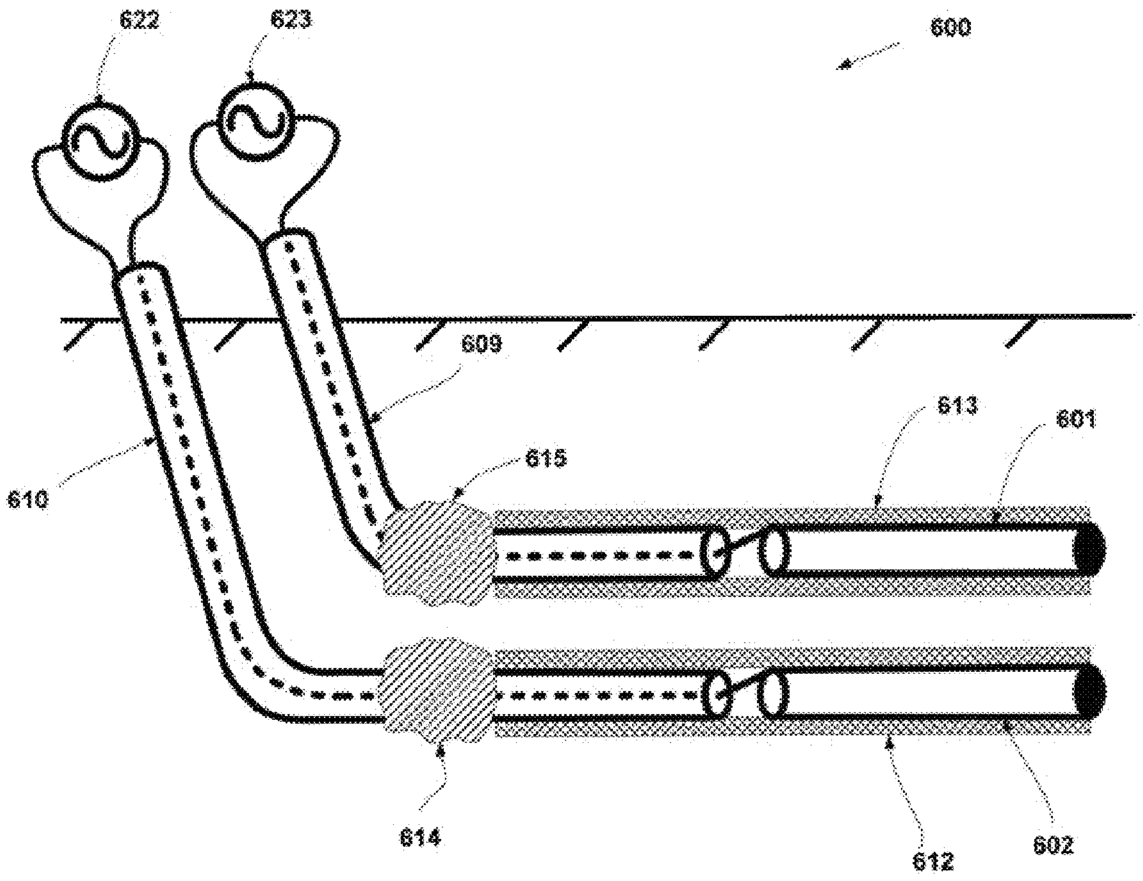
FIG. 9*c* depicts an antenna array with two separate AC sources at the surface.

FIG. 9*c* shows an antenna array with two separate AC sources at the surface, AC source 622 and AC source 623. Each of these AC sources serves a mechanically separate well-antenna. The amplitude and phase of AC sources 622 and 623 may be varied with respect to each other to synthesize different heating patterns underground or control the heating along each well bore individually. For instance, the amplitude of the current supplied by AC source 623 may be much greater than the amplitude of the current supplied by the source 622, which may reduce heating along the lower producer pipe antenna during production. The amplitude of the current supplied by AC source 622 may be made higher than that of AC source 622 during the earlier start up times. Many electrical excitation modes are therefore possible, and well antenna pipes 601 and 602 can be individual antennas or antennas working together as an array.

Electrical currents may be drawn between pipes 601 and 602 by 0 degree and 180 degree relative phasing of AC sources 622 and 633 to concentrate heating between the pipes. Alternatively, AC sources 622 and 603 may be electrically in phase to reduce heating between the pipes 601 and 602. As background, the heating patterns of RF applicator antennas in uniform media tend to be simple trigonometric functions, such as $\cos^2\theta$. However, underground heavy hydrocarbon formations are often anisotropic. Therefore, formation induction resistivity logs should be used with digital analysis methods to predict realized RF heating patterns. The realized temperature contours of RF heating often follow boundary conditions between more and less conductive earth layers. The steepest temperature gradients are usually orthogonal to the earth strata. Thus, FIGS. 9*a*, 9*b*, and 9*c* illustrate antenna array techniques and methods that may be used to adjust the shape of the underground heating by adjusting the amplitude and phases of the currents delivered to the well antennas 601 and 602. It should be understood that three or more well-antennas may be placed underground. The present antenna arrays are not limited to two antennas.

Figure 10:
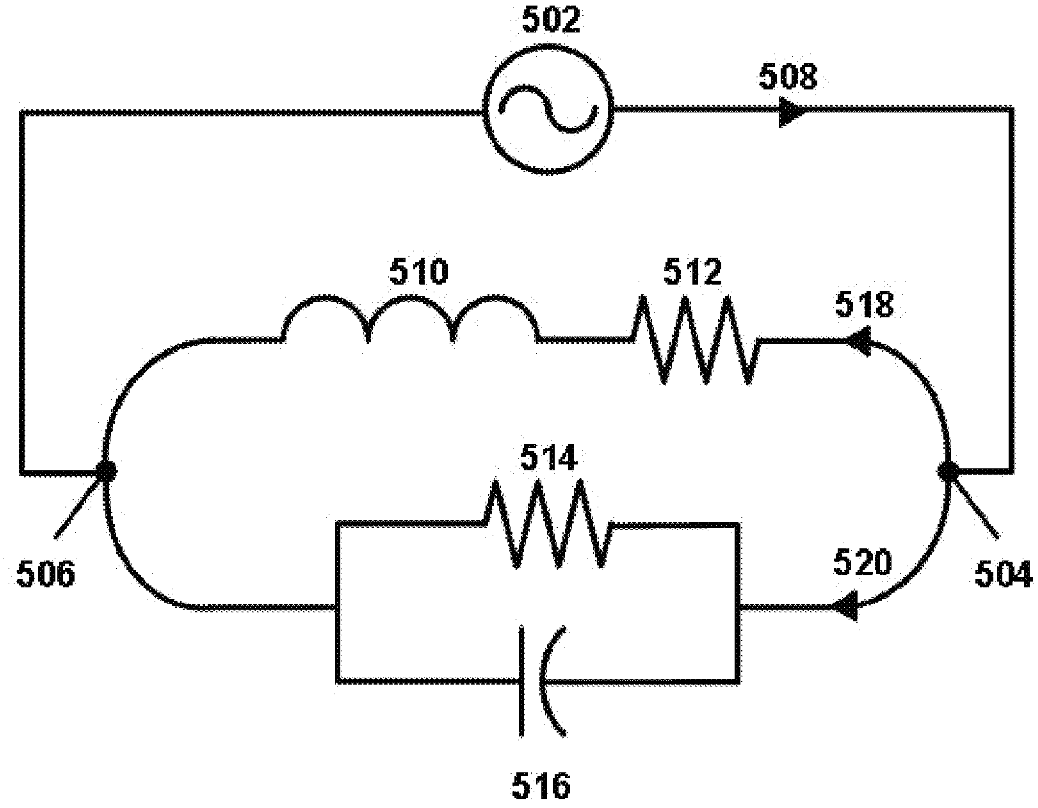
FIG. 10 depicts a circuit equivalent model of an embodiment of the present continuous dipole antenna.

An exemplary circuit equivalent model of the present continuous dipole antenna is shown in FIG. 10. The circuit equivalent model is an electrical diagram that is drawn to represent the electrical characteristics of a physical system for analysis. Thus, it should be understood that FIG. 10 diagram is an artifice for purposes of explanation. An electrical current source, preferably an RF generator, has an electrical potential or voltage 502 ($V_{generator}$) and supplies a current 508 ($I_{generator}$) to the two feed nodes (e.g. terminals), 504 and 506. In this example, there is one node on either side of the magnetic bead. 510 and 512 represent the electrical inductance and resistance, respectively. 510 represents the electrical inductance of the pipe section that passes through the bead ($L_{bead}$) and 512 represents the electrical resistance of the pipe section that passes through the bead ($r_{bead}$). Resistor 514 ($r_{ore}$) and capacitor 516 ($C_{ore}$) represent, respectively, the resistance and capacitance of the hydrocarbon ore that is connected to or coupled across the pipes on either side of the bead. Current 518 passes through the bead ($I_{bead}$) and current 520 passes through the ore ($I_{ore}$). The two paths, through the bead and through the ore, are paralleled across the feed nodes. The current supplied to the ore through this current divider 520 is given by:

$$I_{ore}=[Z_{ore}/(Z_{ore}+Z_{bead})]I_{generator}$$

Figure 11:
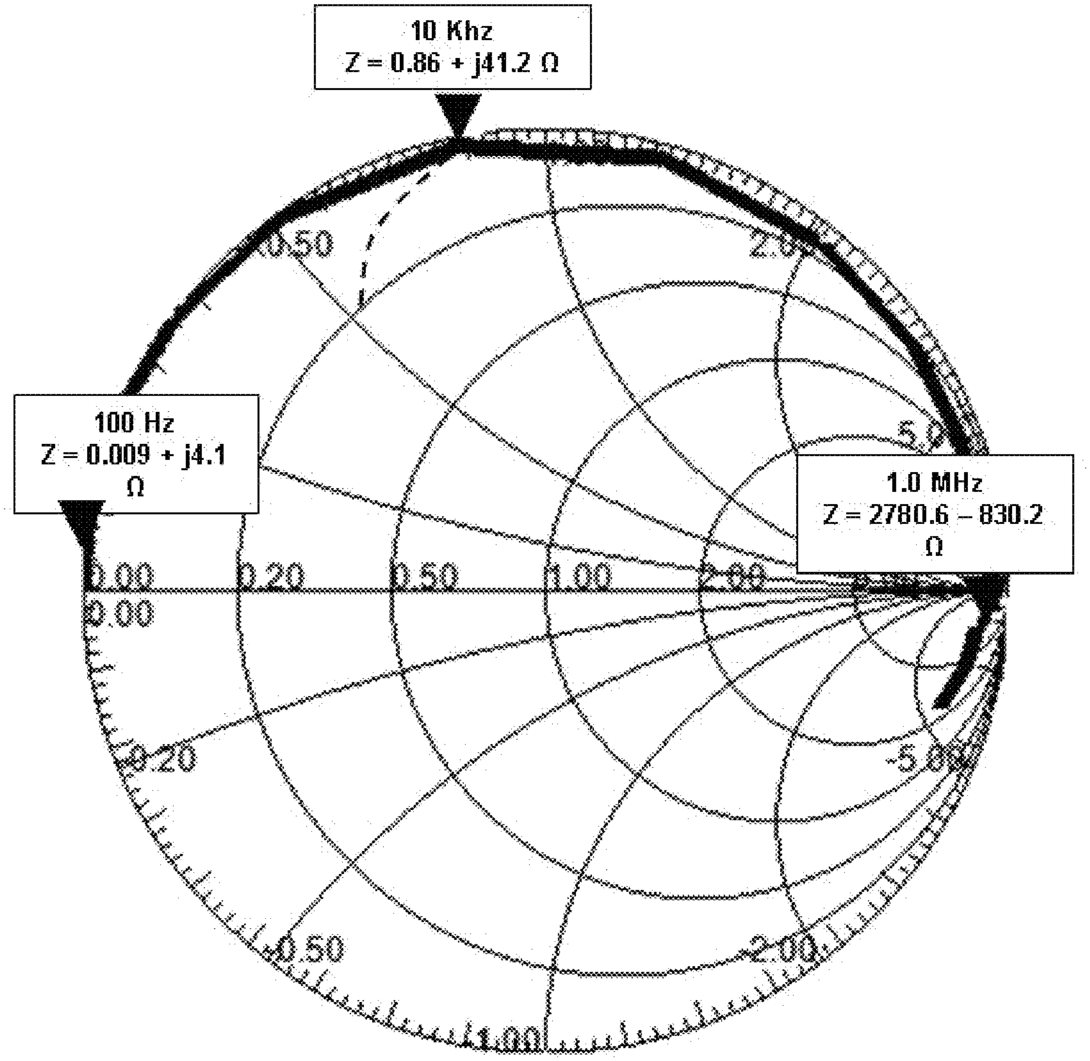
FIG. 11 depicts the self impedance of an exemplary magnetic bead according to the present continuous dipole antenna.

As currents go through the path of least impedance, it suffices that the bead provides an electrical drive for the well "antenna" when $Z_{bead}>>Z_{ore}$. Preferred operation of the present continuous dipole antenna occurs when the inductive reactance of the bead is greater than the load resistance of the ore, i.e. $X_{I\ bead}>>r_{ore}$. The magnetic bead then functions as a series inductor inserted across a virtual gap in the well pipe, which in turn provides a driving discontinuity. For clarity, some characteristics are not shown in the present circuit analysis, such as the conductor resistance of the surface lead(s), the well pipe resistance, the well pipe self inductance, radiation resistance if present, etc. In general, the inductive reactance generated by the pipe passing through the bead is about the same as that of one turn of pipe if it were wrapped around the bead. FIG. 11 shows the self impedance in ohms of an exemplary magnetic bead according to the present continuous dipole antenna. The self impedance is that impedance seen across a small diameter conductive pipe passing through the bead, and does not include the antenna elements. The exemplary bead measures 3 feet in diameter and 6 feet long, and is comprised of sintered manganese zinc ferrite powder mixed with silicon rubber The exemplary bead is about 70 percent ferrite by weight. The relative magnetic permeability, $\mu_r$, of the exemplary bead is 950 farads/meter at 10 KHz. The exemplary bead develops 658 microhenries of inductance at 10 Khz. The inductive reactance of the exemplary bead is sufficient to provide an adequate electrical driving discontinuity for RF heating/stimulation of many hydrocarbon wells. At the lowest frequencies, about 100 to 1000 Hz, the well pipes on either side of the bead may function as electrodes for resistance heating, delivering electrical current to the formation by contact.

At frequencies of about 1 Khz to 100 Khz, the electrical currents passing through the well pipes on either side of the exemplary bead generate magnetic near fields that form eddy currents for induction heating in the ore. The electrical load impedance of the ore is referred to the surface transmitter by the well-antenna, and the ore load impedance generally rises quickly with rising frequency due to induction heating. An example a candidate well-antenna according to the present invention is described in the following table:

| Exemplary Well-Antenna System Data | |
|---|---|
| Well type | Horizontal directional drilling (HDD) |
| Ore | Rich Athabasca oil sand |
| Analysis frequency | 1 Khz |
| Ore initial relative permittivity $\epsilon_r$ | 500 farads/meter (at 1 KHz) |
| Ore initial conductivity, $\sigma$ | 0.005 mhos/meter (at 1 KHz) |
| Ore initial water percentage, by weight | 1.5% |
| Horizontal run length, l | 1 kilometer |

-continued

| Exemplary Well-Antenna System Data | |
|---|---|
| Pipe diameter, d | 28 centimeters |
| Pipe insulation | Outer well pipe is bare |
| Bead location (feedpoint) | Midpoint of horizontal run |
| Bead magnetic material | Sintered powdered manganese ferrite, $\mu_r \approx 950$ |
| Bead matrix material | Silicon rubber (Portland cement also suitable) |
| Bead inductance | >50 millihenries |
| Predominant electrical heating mode | Induction (application of magnetic near fields) from antenna conductors |
| Electrical load resistance of the ore $r_l$ initial | 587 ohms |
| Load capacitance of the ore | 3800 picofarads |
| Radial thermal gradient, initial | About $1/r^7$ |
| Initial radial heat penetration into ore, near the feedpoint (depth for 50 percent energy dissipated) | About 8 meters |

Figure 12:
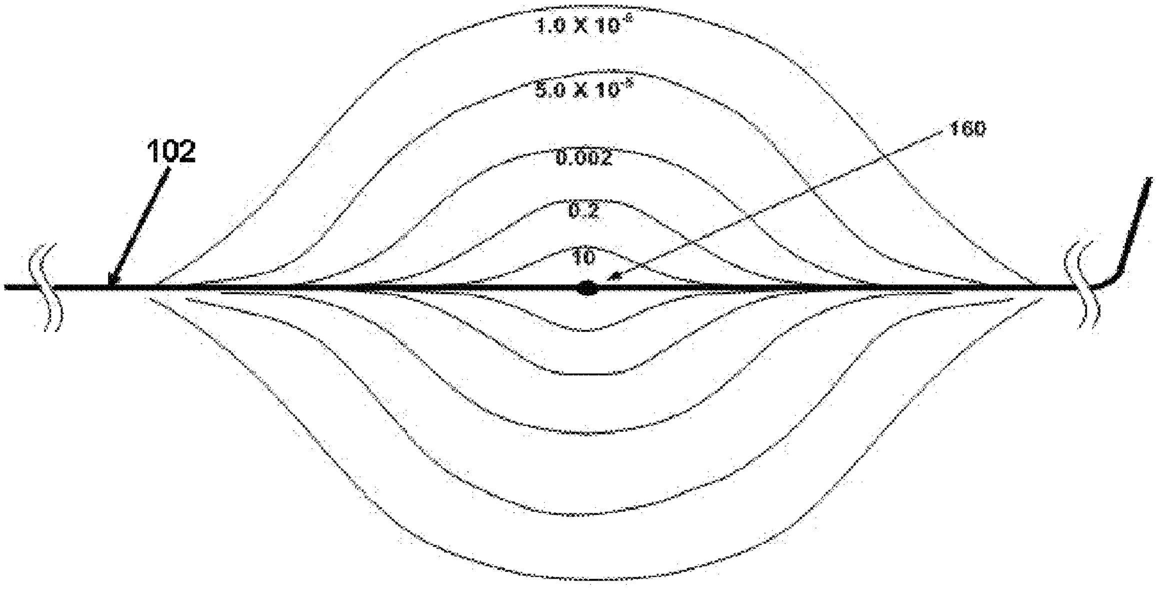
FIG. 12 depicts an exemplary initial heating rate pattern for a continuous dipole antenna well at time t=0 according to the present continuous dipole antenna.

FIG. 12 shows an exemplary pattern of the instantaneous rate of heat application in watts/meter squared in an ore formation stimulated with an antenna-well according to the present continuous dipole antenna. The pattern in FIG. 12 is shown just after the RF power is initially turned on (time t=0), and for a total delivered power to the ore of 5 megawatts. The RF excitation is a sine wave at 1 KHz. The orientation is that of a XY plane cut (horizontal section) through the bottom part of a horizontal directional drilling (HDD) well. As can be appreciated, there is a nearly instantaneous penetration of heat energy many meters deep into the ore formation. This may be much more rapid than conducted heating methods.

Later in time, the initial heating pattern of FIG. 12 will grow longitudinally such that the hydrocarbon ore warms along entire horizontal section of the well. In other words, a saturation temperature zone, e.g. a steam wave (not shown), forms around magnetic bead 160 and grows and travels along pipe-antenna 102. The final realized temperature pattern (not shown), may be nearly cylindrical in shape and cover any desired length along the well.

The rate at which the saturation temperature zone grows and travels depends on the specific heat of the ore, the water content of the ore, the RF frequencies, and the time elapsed. As the [$H_2O$ near the antenna feedpoint (not shown, but on either side of magnetic bead 160) passes in phase from liquid to vapor, thermal regulation is provided because the ore temperature does not rise above the water boiling temperature in the formation. Water vapor is not an RF heating susceptor, while liquid water is an RF heating susceptor. The maximum temperature realized is the boiling ($H_2O$ phase transition) temperature at depth pressure in the ore formation. This may be, for example, from 100 degrees Celsius to 300 degrees Celsius.

The bituminous ores, such as Athabasca oil sand, generally melt sufficiently for extraction at temperatures below that of boiling water at sea level. The well-antenna will reliably continue to heat the ore even when it does not have electrically conductive contact with ore water because the RF heating includes both electric and magnetic (E and H)) fields. In general the mechanism of RF heating associated with the present continuous dipole antenna is not necessarily limited to electric or magnetic heating. The mechanisms may include one or more of the following: resistive heating by the application of electric currents (I) to the ore with the well pipes or other antenna conductors comprising bare electrodes; induction heating involving the formation of eddy currents in the ore by application of magnetic near fields H from the well pipes or other antenna conductors; and heating resulting from displacement currents conveyed by application of electric near fields (E). In the latter case, the well-antenna may be thought of as akin to capacitor plates.

It may be desirable in accordance with the present continuous dipole antenna to electrically insulate the well-antenna from the ore with an electrically nonconductive layer or coating sufficient to eliminate direct electrode-like conduction of electric currents into the ore. This is intended to provide more uniform heating initially. Of course the well-antenna may be electrically uninsulated from the ore as well, and electric and magnetic field heating may still be utilized.

Figure 13:
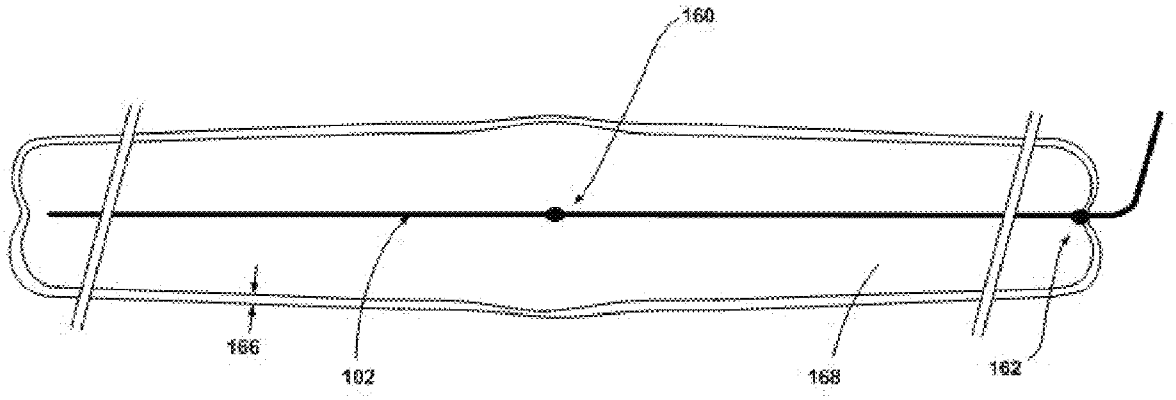
FIG. 13 depicts a simplified temperature map of an exemplary well.

FIG. 13 shows a simplified temperature map of an exemplary well, electromagnetically heated in accordance with the present continuous dipole antenna. In FIG. 13, the RF electromagnetic heating has been allowed to progress for some time. Thus, the initial heat application pattern depicted in FIG. 12 has expanded to cause a large zone of ore to be heated along the entire horizontal length of the well-antenna 102. A saturation temperature zone 168 in the form of a traveling wave steam front has propagated outward from nonconductive magnetic bead 160. Saturation temperature zone 168 may comprise an oblate three-dimensional region in which the temperature has risen to the boiling point of the in situ water. The temperature in saturation zone 168 depends upon the pressure at the depth of the ore formation.

The saturation temperature zone 168 may contain mostly bitumen and sand, particularly if the ore withdrawal has not begun. Saturation temperature zone 168 may be a steam filled cavity if the ore has already been extracted for production. Depending on the extent of the heating and production, the saturation temperature zone may also be a mix of bitumen, sand and/or vapor A Gradient temperature zone 166 is also depicted in FIG. 13. Gradient temperature zone 166 may comprise a wall of melting bitumen, which is draining by gravity to a nearby or underneath producer well (not shown). The temperature gradient may be rapid due to the RF heating to enhance melting. The diameter of saturation temperature zone 168 may be varied relative to its length by the varying the radio frequency (hertz), by varying the applied RF power (watts), and/or the time duration of the RF heating (e.g., minutes, hours or days)

The electromagnetic heating is durable and reliable as the well-antenna can continue heating in gradient temperature zone 166 regardless of the conditions in saturation temperature zone 168. The well-antenna 102 does not require liquid water contact at the antenna surface to continue heating because the electric and magnetic fields develop outward to reach the liquid water and continue the heating. The in-situ liquid water in the ore undergoes electromagnetic heating, and the ore as a whole heats by thermal conduction to the in situ water. As steam is not an electromagnetic heating susceptor, a form of thermal regulation occurs, and the temperatures may not exceed the boiling temperatures of the water in the ore.

Unlike conventional steam extraction methods where steam is forced into the well through pipes, the electromagnetic heating of the present continuous dipole antenna can occur through impermeable rocks and without the need for convection. The electromagnetic heating may reduce the need for caprock over the hydrocarbon ore as may be required with steam enhanced oil recovery methods are utilized. In addition, the need for surface water resources to make injection steam can be reduced or eliminated.

The RF heating can be stopped and started virtually instantaneously to regulate production. The RF heating may RF only for the life of the well. However, the RF heating may be accompanied by conventional steam heating as well. In that case, the RF heating may be advantageous because it may begin convection for startup of the conventional steam heating. The RF heating may also drive injected solvents or catalysts to enhance the oil recovery, or to modify the characteristics of the product obtained. Thus, the RF heating may be used for initiating convective flows in the ore for later application of steam heating, or the heating may be RF only for the life of the well, or both.

The second non-conductive magnetic bead 162 shown in FIG. 13 is used to prevent unwanted heating in the overburden. Second non-conductive magnetic bead 162 suppresses electrical current flow in the antenna beyond the bead 162 location towards the surface. This is an advantage of the present continuous dipole antenna over steam where the well is operated through permafrost. Unlike steam injection methods for enhanced oil recovery, the well piping using the present continuous dipole antenna may be much cooler near the surface than the well piping using steam injection methods.

When the word nonconductive or electrically nonconductive is stated for the magnetic bead materials it should be understood that what is meant is for the bead to be nonconductive in bulk. The strongly magnetic elements, e.g., Fe, NI, Co, Gd, and Dy, are of course electrically conductive, and in RF applications this may lead to eddy currents and reduced magnetic permeability. This is mitigated in the present continuous dipole antenna bead by forming multiple regions of magnetic material in the bead, and insulating them from one another. This insulation may comprise, for example, laminations, stranding, wire wound cores, coated powder grains, or polycrystalline lattice doping (ferrites, garnets, spinels), The individual magnetic particles may be comprised of groups many atoms, yet it may be preferential, but not required, that the particle size be less than about one radio frequency skin depth. Skin depth may be predicted according to the formula:

$$\Delta\delta=(1/\sqrt{\pi\mu_0})[\sqrt{\rho/\mu_r f}]$$

Where:

δ=the skin depth in meters;

$\mu_0$=the magnetic permeability of free space≈$4\pi\times10^{-7}$ henry/meter;

$\mu_r$=the relative magnetic permeability of the medium;

ρ=the resistivity of the medium in ohm/meter; and f=the frequency of the wave in hertz The individual magnetic particles may be immersed in a nonconductive media such as, for example and not by way of limitation, Portland cement, silicon rubber, or phenol. Immersing the particles in such media serve to insulate one particle from another. Each magnetic particle may also have an insulative coating on its surface, such as iron phosphate ($H_3PO_4$), for example. The magnetic particles may also be mixed into Portland cement that is used to seal the well pipe into the earth. In that case, the bead may thus be injected into place, e.g. molded in situ. Some suitable bead materials include: fully sintered powdered manganese zinc ferrites, such as type M08 as manufactured by the National Magnetics Group Inc. of Bethlehem, Pa.; FP215 by Powder Processing Technology LLC of Valparaiso Ind., and mix 79 by Fair-Rite Products of Wallkill, N.Y.

The well pipes may be electrically insulated or electrically uninsulated from the ore in the present continuous dipole antenna. In other words, the pipes may have a nonconducting outer layer, or no outer layer at all. When the pipes are uninsulated, the conductive contact of the pipe to the ore permits joule effect ($P=I^2R$) resistive heating via the flow of conducted currents from the well pipe antenna half elements into the ore. Thus, the well pipes themselves become electrodes. This method of operation is preferably conducted at frequencies from DC to about 100 Hz, although the present continuous dipole antenna is not limited to that frequency range.

When the pipes are insulated from the ore, the flow of RF electric current along the pipe transduces a magnetic near field around the pipe permitting induction heating of the ore. This is because the pipe antenna's circular magnetic near field transduces eddy electric currents in the ore via a compound or two step process. The eddy electric currents ultimately heat by joule effect ($P=I^2R$). The induction mode of RF heating may be preferential from say 1 KHz to 20 KHz, although the present continuous dipole antenna is not limited to only this frequency range.

Induction heating load resistance typically rises with frequency. Yet another heating mode may form where displacement currents are transduced into the ore from insulated pipes by near electric (E) fields. The present continuous dipole antenna may thus apply heat to the ore using many electrical modes, and is not limited to any one mode in particular.

The well pipes of the present invention may optionally contain a plurality of magnetic beads to form multiple electrical feedpoints along the well pipe (not shown). The multiple feedpoints may be wired in series or in parallel. The plurality of bead feed points may vary current distributions (current amplitude and phase with position) along the pipe. These current distributions may be synthesized, e.g. uniform, sinusoidal, binomial or even traveling wave.

In accordance with the present continuous dipole antenna, the frequency of the transmitter may be varied to increase or decrease the coupling of the antenna into the ore load over time. This in turn varies the rate of heating, and the electrical load presented to the transmitter. For instance, the frequency may be raised over time or as the resource is withdrawn from the formation.

The shape of well bead 160 may be for instance spherical or oblate or even a cylinder or sleeve. The spherical bead shape may be preferential for conserving material requirements while the elongated shape preferential for installation needs. The bead 160 may comprise a region of the pipe with a thin coating. For example, well bead 160 may be substantially elongated in aspect and conformal to permit insertion into the well bore along with the pipe.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged either in whole or in part. Therefore, the spirit and scope of the appended claims should not be limited to the description of the preferred versions contained herein.

The invention claimed is:

1. An apparatus for heating hydrocarbon resources in a subterranean formation having a wellbore therein, the apparatus comprising:

an electrically conductive well pipe within the wellbore;

a radio frequency (RF) power source;

an RF feed line coupled to said RF power source and comprising first and second feed conductors coupled to said electrically conductive well pipe at respective spaced apart locations; and a first non-conductive magnetic bead surrounding a first portion of said electrically conductive well pipe within the wellbore and between the respective spaced apart locations.

2. The apparatus of claim 1, wherein said first non-conductive magnetic bead comprises at least one of ferrite, loadstone, magnetite, powdered iron, iron flakes, silicon steel particles, and surface insulator coated pentacarbonyl E iron powder.

3. The apparatus of claim 1, wherein said first non-conductive magnetic bead extends from above the subterranean formation to within the wellbore.

4. The apparatus of claim 1, wherein said first non-conductive magnetic bead comprises Portland cement and magnetic powder.

5. The apparatus of claim 1, wherein said RF feed line comprises a coaxial RF feed line.

6. The apparatus of claim 1, wherein said RF feed line comprises one of a twin-axial RF feed line, a triaxial RF feed line, and a diaxial RF feed line.

7. The apparatus of claim 1, further comprising a second non-conductive magnetic bead surrounding a second portion of said electrically conductive well pipe and spaced apart from said first non-conductive magnetic bead.

8. The apparatus of claim 7, wherein said second non-conductive magnetic bead comprises at least one of ferrite, loadstone, magnetite, powdered iron, iron flakes, silicon steel particles, and surface insulator coated pentacarbonyl E iron powder.

9. The apparatus of claim 1, wherein said RF source is above the subterranean formation.

10. The apparatus of claim 1, wherein the wellbore extends laterally within the subterranean formation.

11. An apparatus for heating hydrocarbon resources in a subterranean formation having a wellbore therein, the apparatus comprising:

an electrically conductive well pipe within the wellbore;

a radio frequency (RF) power source;

an RF feed line coupled to said RF power source and comprising first and second feed conductors coupled to said electrically conductive well pipe at respective spaced apart locations;

a first non-conductive magnetic bead surrounding a first portion of said electrically conductive well pipe within the wellbore and between the respective spaced apart locations; and a second non-conductive magnetic bead surrounding a second portion of said electrically conductive well pipe within the wellbore and spaced apart from said first non-conductive magnetic bead.

12. The apparatus of claim 11, wherein said first non-conductive magnetic bead comprises at least one of ferrite, loadstone, magnetite, powdered iron, iron flakes, silicon steel particles, and surface insulator coated pentacarbonyl E iron powder.

13. The apparatus of claim 11, wherein said first non-conductive magnetic bead extends from above the subterranean formation to within the wellbore.

14. The apparatus of claim 11, wherein said first non-conductive magnetic bead comprises Portland cement and magnetic powder.

15. The apparatus of claim 11, wherein said RF feed line comprises a coaxial RF feed line.

16. The apparatus of claim 11, wherein said RF feed line comprises one of a twin-axial RF feed line, a triaxial RF feed line, and a diaxial RF feed line.

17. The apparatus of claim 11, wherein said second non-conductive magnetic bead comprises at least one of ferrite, loadstone, magnetite, powdered iron, iron flakes, silicon steel particles, and surface insulator coated pentacarbonyl E iron powder.

18. The apparatus of claim 11, wherein the wellbore extends laterally within the subterranean formation.

19. A method of heating hydrocarbon resources in a subterranean formation having a wellbore therein, the method comprising:

applying radio frequency (RF) power from an RF power source to an electrically conductive well pipe positioned within the wellbore via an RF feed line coupled to the RF power source and comprising first and second feed conductors coupled to the electrically conductive well pipe at respective spaced apart locations, the electrically conductive well pipe having a first non-conductive magnetic bead surrounding a first portion of thereof within the wellbore and between the respective spaced apart locations.

20. The method of claim 19, wherein the first non-conductive magnetic bead comprises at least one of ferrite, loadstone, magnetite, powdered iron, iron flakes, silicon steel particles, and surface insulator coated pentacarbonyl E iron powder.

21. The method of claim 19, wherein the first non-conductive magnetic bead extends from above the subterranean formation to within the wellbore.

22. The method of claim 19, wherein the RF feed line comprises a coaxial RF feed line.

23. The method of claim 19, wherein applying RF power further comprises applying RF power to the electrically conductive well pipe having a second non-conductive magnetic bead surrounding a second portion thereof and spaced apart from the first non-conductive magnetic bead.

* * * * *